(12) United States Patent
Yamane et al.

(10) Patent No.: US 8,898,168 B2
(45) Date of Patent: *Nov. 25, 2014

(54) INFORMATION SEARCHING APPARATUS, INFORMATION SEARCHING METHOD, AND COMPUTER PRODUCT

(71) Applicant: Fujitsu Limited, Kawasaki (JP)

(72) Inventors: Yasuo Yamane, Kawasaki (JP); Nobuyuki Igata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,410

(22) Filed: Oct. 10, 2013

(65) Prior Publication Data

US 2014/0040267 A1 Feb. 6, 2014

Related U.S. Application Data

(63) Continuation of application No. 12/407,973, filed on Mar. 20, 2009, now Pat. No. 8,583,646.

(30) Foreign Application Priority Data

Apr. 11, 2008 (JP) ................................. 2008-103835

(51) Int. Cl.
*G06F 17/30* (2006.01)
(52) U.S. Cl.
CPC .... *G06F 17/30598* (2013.01); *G06F 17/30958* (2013.01)
USPC ........................... 707/737; 707/705; 707/736
(58) Field of Classification Search
CPC ..................... G06F 17/30598; G06F 17/30958

USPC .......................................... 707/705, 756, 737
See application file for complete search history.

(56) References Cited

U.S. PATENT DOCUMENTS 5,748,844 A 5/1998 Marks
6,055,540 A 4/2000 Snow et al.
(Continued)

FOREIGN PATENT DOCUMENTS

JP 8-212249 8/1996
JP 2000-123041 4/2000
JP 2007-172707 6/2000

OTHER PUBLICATIONS

Front Line of Network Theory,Kazuhiro Kojima,Front Line of Network Theory—From Basics to Applications—http://staff.aist.go.jp/k.kojimajarchives/smips2006.pdf p. 22-25.
(Continued)

*Primary Examiner* — Mahesh Dwivedi
(74) *Attorney, Agent, or Firm* — Fujitsu Patent Center

(57) ABSTRACT

An information searching apparatus retrieves a sub graph matching an inquiry graph from a graph to be searched. The apparatus includes an extracting unit that extracts, from among clusters of nodes in the graph to be searched, plural cluster pairs that each include a first cluster and a second cluster including a node linked by a link to a node in the first cluster and a calculating unit that calculates a bonding strength for each of the cluster pairs. The apparatus further includes a determining unit that determines, among the cluster pairs and based on the bonding strength of each of the cluster pairs, a cluster pair to be merged; a merging unit that merges the cluster pair; and a searching unit that searches the merged clusters for a sub graph matching the inquiry graph. An output unit outputs a search result of the searching unit.

2 Claims, 25 Drawing Sheets

(56) References Cited

U.S. PATENT DOCUMENTS

| | | | |
|---|---|---|---|
| 7,613,712 | B2 | 11/2009 | Greenblatt et al. |
| 7,774,288 | B2 | 8/2010 | Acharya et al. |
| 2004/0093321 | A1* | 5/2004 | Roustant et al. .................. 707/3 |
| 2006/0112125 | A1* | 5/2006 | Potok et al. .................. 707/101 |
| 2007/0198454 | A1* | 8/2007 | Greenblatt et al. ............. 707/1 |
| 2007/0271287 | A1* | 11/2007 | Acharya et al. ............. 707/101 |
| 2009/0043797 | A1* | 2/2009 | Dorie et al. .................. 707/101 |
| 2010/0318558 | A1* | 12/2010 | Boothroyd .................. 707/769 |

OTHER PUBLICATIONS

Wikipedia, "Complex Networks", 8 pages, Partial English-language Translation [http://ja.wikipedia.org/wiki/%E8%A4%87%E9%9B%91%E3%83%8D%E3%83%83%E3%83%88%E3%AF%E3%83%BC%E3%82%AF], 2012.

Japan Patent Office, Notice of Rejection, mailed Oct. 16, 2012, in connection with JP Application No. 2008-103835, with English-language translation.

Sakaki et al., Construction of Related Terms Thesauri from the Web, Journal of Natural Language Processing, Japan, The Association for Natural Language Processing, Apr. 10, 2007, vol. 14, No. 2, pp. 3-31.

Ohno et al., Clustering Web Pages Based on Maximum Flow Algorithm, Journal of Information Processing Society, Japan, Information Processing Society, Mar. 15, 2006, vol. 47, SIG4 (TOD29), pp. 65-75.

Jena Semantic Web Framework [On line] <http://jena.sourceforge.net/> searching date: Jan. 28, 2008.

RDF Store, Perl/C RDF Storage and API [On line] <http://rdfstore.sourceforge.net/> searching date: Jan. 28, 2008.

USPTO, Non Final Rejection of U.S. Appl. No. 12/407,973 (parent), mailed Sep. 19, 2011.

USPTO, Non Final Rejection of U.S. Appl. No. 12/407,973 (parent), mailed Apr. 25, 2012.

USPTO, Final Rejection of U.S. Appl. No. 12/407,973 (parent), mailed Jan. 3, 2013.

USPTO, Notice of Allowance of U.S. Appl. No. 12/407,973 (parent), mailed Jul. 11, 2013.

* cited by examiner

| NODE IDENTIFIER | COMPANY NAME | ADDRESS | TYPE OF BUSINESS | ... |
|---|---|---|---|---|
| Na | COMPANY A | TOKYO... | COMPUTER | ... |
| Nb | COMPANY B | KANAGAWA... | DISTRIBUTION | ... |
| Nc | ... | ... | ... | ... |
| Nd | ... | ... | ... | ... |
| Ne | ... | ... | COMPUTER | ... |
| Nf | ... | ... | ... | ... |
| Ng | ... | ... | ... | ... |
| Nh | ... | ... | BIOTECHNOLOGY | ... |
| Ni | ... | ... | COMPUTER | ... |
| Nj | ... | ... | BIOTECHNOLOGY | ... |
| Nk | ... | ... | ... | ... |
| Nl | ... | ... | ... | ... |

| FINANCING COMPANY | FINANCED COMPANY | AMOUNT |
|---|---|---|
| Na | Nb | 30 |
| Na | Nc | 80 |
| Na | Ni | 50 |
| Nb | Nd | 5 |
| Nb | Ne | 3 |
| Nc | Nd | 40 |
| Ne | Nf | 2 |
| Ne | Ng | 10 |
| Nf | Nh | 30 |
| Ng | Nh | 50 |
| Ni | Nc | 20 |
| Ni | Nj | 200 |
| Ni | Nk | 100 |
| Nk | Nj | 20 |
| Nl | Ni | 30 |
| Nl | Nk | 15 |

FIG.11

CLUSTER C₁

| FINANCING COMPANY | FINANCED COMPANY | AMOUNT |
|---|---|---|
| Na | b | 30 |
| Na | c | 80 |
| Nb | d | 5 |
| Nc | d | 40 |

800-1

CLUSTER C₃

800-3

| FINANCING COMPANY | FINANCED COMPANY | AMOUNT |
|---|---|---|
| Ni | j | 200 |
| Ni | k | 100 |
| Nk | j | 20 |
| Nl | i | 30 |
| Nl | k | 15 |

CLUSTER C₂

| FINANCING COMPANY | FINANCED COMPANY | AMOUNT |
|---|---|---|
| Ne | f | 2 |
| Ne | g | 10 |
| Nf | h | 30 |
| Ng | h | 50 |

| NODE IDENTIFIER | COMPANY NAME | ADDRESS | TYPE OF BUSINESS | ... | CLUSTER IDENTIFIER |
|---|---|---|---|---|---|
| Na | COMPANY A | TOKYO... | COMPUTER | ... | $C_1$ |
| Nb | COMPANY B | KANAGAWA... | DISTRIBUTION | ... | $C_1$ |
| Nc | ... | ... | ... | ... | $C_1$ |
| Nd | ... | ... | ... | ... | $C_1$ |
| Ne | ... | ... | COMPUTER | ... | $C_2$ |
| Nf | ... | ... | ... | ... | $C_2$ |
| Ng | ... | ... | ... | ... | $C_2$ |
| Nh | ... | ... | BIOTECHNOLOGY | ... | $C_2$ |
| Ni | ... | ... | COMPUTER | ... | $C_3$ |
| Nj | ... | ... | BIOTECHNOLOGY | ... | $C_3$ |
| Nk | ... | ... | ... | ... | $C_3$ |
| Nl | ... | ... | ... | ... | $C_3$ |

700    1201
1200

HIERARCHICAL PROPERTY
SELF-SIMILARITY

INFORMATION SEARCHING APPARATUS, INFORMATION SEARCHING METHOD, AND COMPUTER PRODUCT

CROSS-REFERENCE TO RELATED APPLICATIONS

This application is a continuation application of U.S. patent application Ser. No. 12/407,973, now U.S. Pat. No. 8,583,646, and is based on upon and claims the benefit of priority from the prior Japanese Patent Application No. 2008-103835, filed on Apr. 11, 2008, the entire contents of which are incorporated herein by reference.

BACKGROUND OF THE INVENTION

1. Field of the Invention

The present invention relates to information search and retrieval, and a graph search.

2. Description of the Related Art

Search engines are now indispensable in daily life when searching for information on the Web. However, search results often include unnecessary results different from those expected, a consequence of searching by character string matching without consideration of semantic factors. The tendency for search results to include unnecessary results is increasing as Web data explosively increases.

A study of the Semantic Web has been conducted with an objective of finding a solution to the problem above. In the Semantic Web, primary information is extracted from a Web page as structural data referred to as metadata. This metadata is structured to enable a computer to easily understand the semantic contents. In this meaning, metadata is analogous to a database such as a relational database (RDB). Hence, different from an information search by a search engine, the Semantic Web enables a search that further includes consideration of semantic contents, thereby improving retrieval precision.

Metadata is data that has a graph (network) structure referred to as Resource Description Framework (RDF), and is written in Extensible Markup Language (XML) having a hierarchical structure. RDF searches have already been put in practice on commercial database systems.

With respect to RDF searches, some prototype systems have been released, including Jena (see "Jena Semantic Web Framework [Online] [searched on Jan. 28, 2008], Internet <http://jena.sourceforge.net/>") and RDFStore (see "RDFS-tore Perl/C RDF Storage AND API [Online] [searched on Jan. 28, 2008], Internet <http://rdfstore.sourceforge.net/>"), etc. These prototype systems generally employ a method of regarding a graph as clusters of triple data sets and storing the triple data sets in an RDB.

According to the triple data set method disclosed in the above literatures, a process called join is used frequently to search for a sub graph matching an inquiry graph. Join is a primary calculation used frequently in an RDB; however, combined with sorting, join also creates a heavy process load. Join, therefore, poses a problem of a slower search speed that leads to a longer search time. An explosive increase in data can be expected in the future; hence, the problem of a longer calculation time is not expected to be solved. If all the clusters are to be searched, clusters not matching the inquiry graph will also be searched, thereby lowering the search speed and leading to a longer search time.

SUMMARY OF THE INVENTION

It is an object of the present invention to at least solve the above problems in the conventional technologies.

A computer-readable recording medium according to one aspect of the present invention stores therein an information searching program of a computer that retrieves a sub graph matching an inquiry graph from a graph to be searched including nodes and a link interlinking the nodes. The information searching program causes the computer to execute extracting, from among clusters of nodes in the graph to be searched, a plurality of cluster pairs, each of the cluster pairs consisting of a first cluster and a second cluster including a node linked by a link to a node in the first cluster, wherein the clusters include nodes that differ; calculating a bonding strength for each of the cluster pairs extracted at the extracting; determining, among the cluster pairs and based on the bonding strength of each of the cluster pairs, a cluster pair to be merged; merging the cluster pair determined at the determining; searching merged clusters formed at the merging, for a sub graph matching the inquiry graph; and outputting a search result of the searching.

An information searching apparatus according to another aspect of the present invention retrieves a sub graph matching an inquiry graph from a graph to be searched including nodes and a link interlinking the nodes. The information searching apparatus includes an extracting unit that extracts, from among clusters of nodes in the graph to be searched, a plurality of cluster pairs, each of the cluster pairs consisting of a first cluster and a second cluster including a node linked by a link to a node in the first cluster, wherein the clusters include nodes that differ; a calculating unit that calculates a bonding strength for each of the cluster pairs extracted by the extracting unit; a determining unit that determines, among the cluster pairs and based on the bonding strength of each of the cluster pairs, a cluster pair to be merged; a merging unit that merges the cluster pair determined by the determining unit; a searching unit that searches merged clusters formed by the merging unit, for a sub graph matching the inquiry graph; and an output unit that outputs a search result of the searching unit.

An information searching method according to still another aspect of the present invention is a method of retrieving a sub graph matching an inquiry graph from a graph to be searched including nodes and a link interlinking the nodes. The information searching method includes extracting, from among clusters of nodes in the graph to be searched, a plurality of cluster pairs, each of the cluster pairs consisting of a first cluster and a second cluster including a node linked by a link to a node in the first cluster, wherein the clusters include nodes that differ; calculating a bonding strength for each of the cluster pairs extracted at the extracting; determining, among the cluster pairs and based on the bonding strength of each of the cluster pairs, a cluster pair to be merged; merging the cluster pair determined at the determining; searching merged clusters formed at the merging, for a sub graph matching the inquiry graph; and outputting a search result of the searching.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a table depicting the relationship between financing companies and financed companies;

FIG. 11 is a schematic of separated link tables;

FIG. 12 is a view of a node table to which cluster identifiers have been added;

DETAILED DESCRIPTION OF THE PREFERRED EMBODIMENTS

Referring to the accompanying drawings, exemplary embodiments according to the present invention are explained in detail below.

In this embodiment, a graph is searched and from the graph, a sub graph matching an inquiry graph is retrieved. The graph searched is a network composed of nodes and links interlinking the nodes. Fields subject to the search include the Web, transportation networks, communication networks, molecular structures, and human relationships, all expressed as networks. The graph to be searched may be a directional graph having links indicative of direction, or a nondirectional graph.

Figure 1:
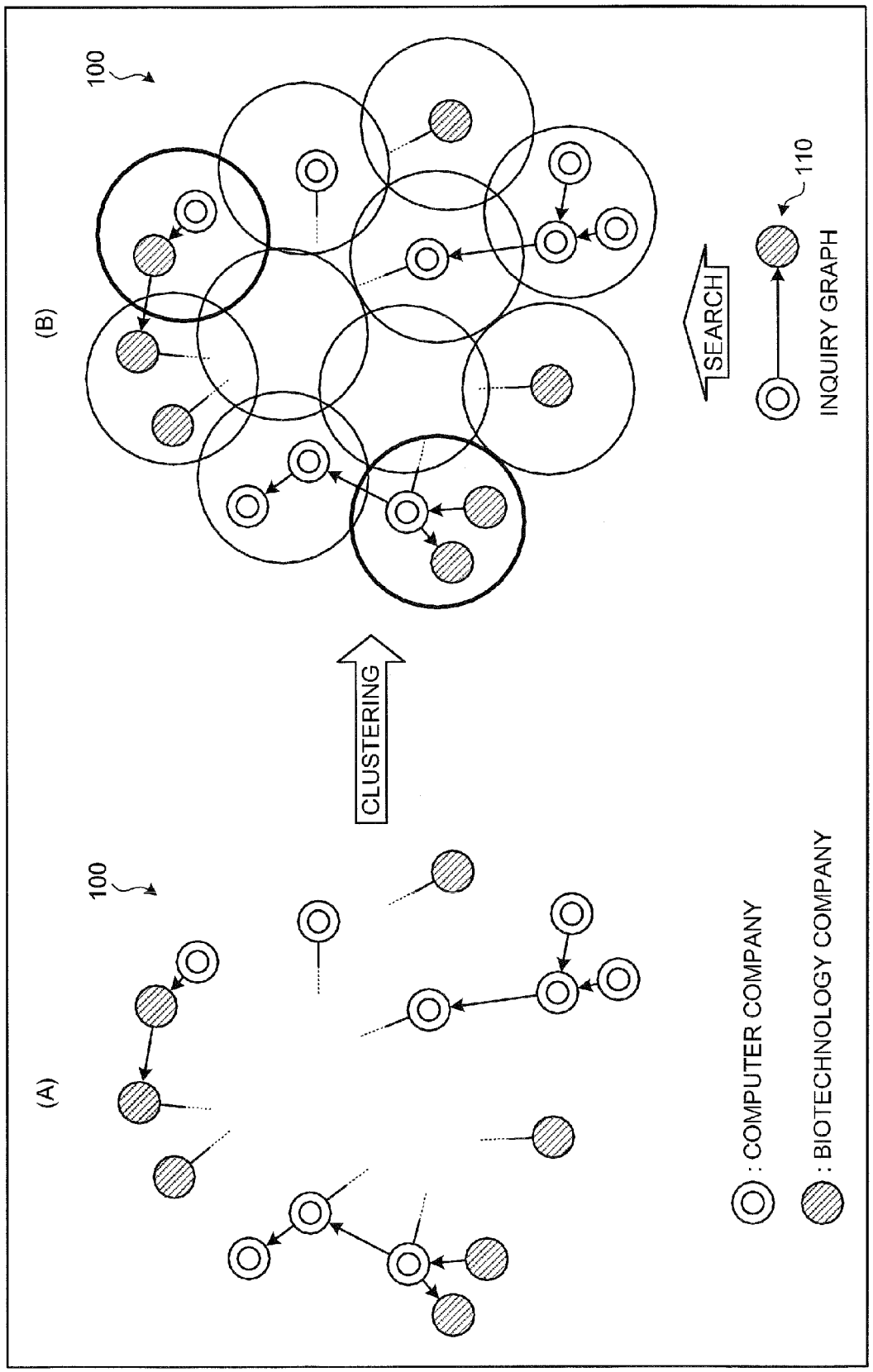
FIG. 1 is a schematic of a search using clustering.

FIG. 1 is a schematic of a search using clustering. Section (A) in FIG. 1 denotes a graph to be searched 100. In the graph to be searched 100, small circles represent nodes, among which small double-ringed circles represent computer companies and small circles with hatching represent biotechnology companies. Arrows between nodes represent links. In the graph to be searched 100, the company represented by the node where an arrow starts provides capital to the company represented by the node where the arrow terminates.

The result of clustering carried out on the graph to be searched 100 is depicted in section (B) of FIG. 1. In section (B), circles encompassing nodes and links represent clusters. A cluster is a linked sub graph including at least a node in the graph to be searched 100. When plural nodes are included, the cluster further includes a link. Clustering is a process of dividing a graph into clusters so that none of the clusters have a common portion and an arbitrary node is included in any one of the clusters. The same node, therefore, is not included in more than one cluster.

In section B, an inquiry graph 110 is given. The inquiry graph 110 is a graph that represents a user inquiry concerning the graph search and is provided as a search condition. Section B indicates that computer companies finance biotechnology companies. In section B, a cluster that potentially includes a sub graph matching the inquiry graph 110 is indicated by a thick lined circle. Each cluster depicted by a thin lined includes either a computer company or a biotechnology company only and thus has no possibility of matching the inquiry graph 110.

Therefore, clusters depicted by thin lined circles are not subject to searching, thereby enabling increased search speed. In this manner, a search range can be reduced by clustering. However, the manner by which the clustering is to be performed is a problem.

As described above, clustering is a division of the graph to be searched 100 into plural clusters (subgraphs) and is further performed according to the following terms (1-1) to (1-4).

(1-1) A node is included in any one (and only one) of the clusters.

(1-2) A cluster is a linked sub graph.

With consideration of performance concerning narrowing the search range, the following two terms are important.

(1-3) Reduce the number of links between clusters as much as possible.

(1-4) Divide the graph to be searched as a whole in good balance to equalize the number of nodes included in each cluster as much as possible.

Figure 2:
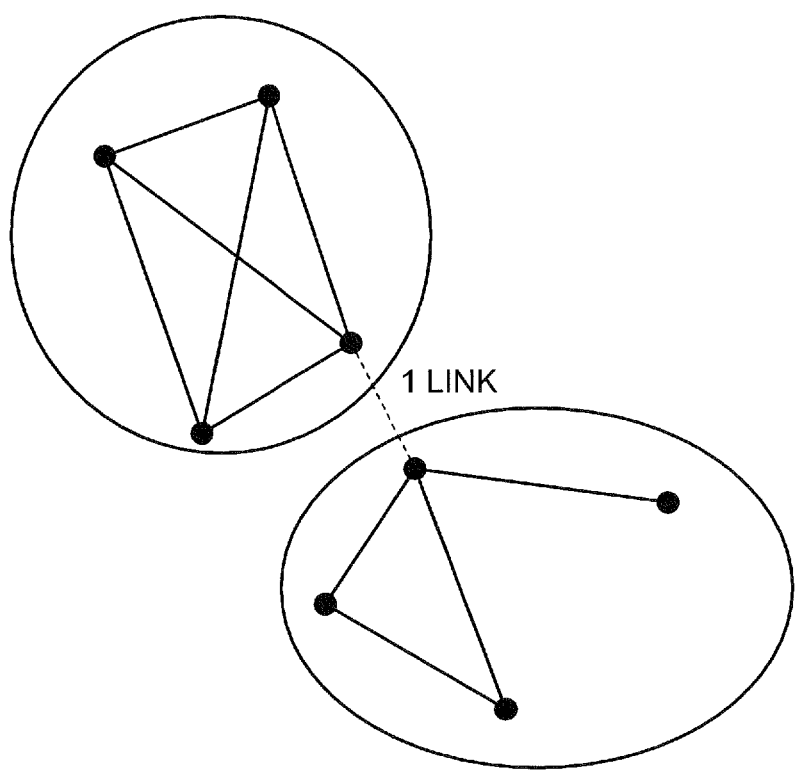
FIG. 2 is a view of an example of clustering.
Figure 3:
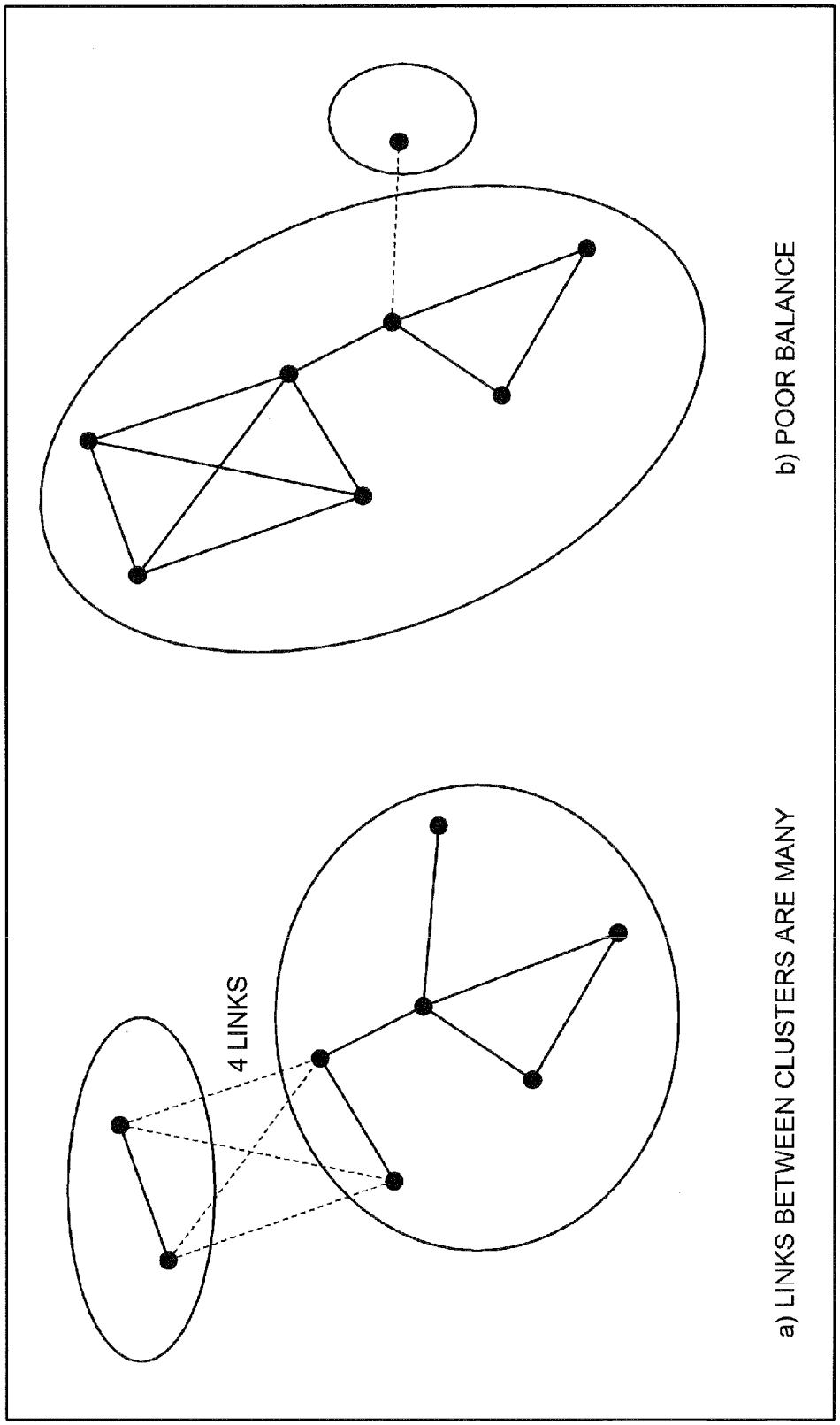
FIG. 3 is a view of another example of clustering.

FIGS. 2 and 3 are views of examples of clustering. In FIGS. 2 and 3, dots represent nodes, and solid lines interconnecting nodes represent links. Among the links, those expressed by dotted lines represent links between clusters.

The example depicted in FIG. 2 is a preferable clustering with respect to the terms (1-3) and (1-4). FIG. 3, on the contrary, is an example of clustering that is not preferable. Section a in FIG. 3 depicts a case where the number of links between clusters is great (in this example, 4) and therefore, is not preferable with respect to the term (1-3). Section B in FIG. 3 depicts a case where balance is poor. In this example, there is one link between clusters, which is preferable; however, with respect to the term (1-4), section B is not preferable. In this embodiment, clustering is performed according to the principle as described above.

Figure 4:
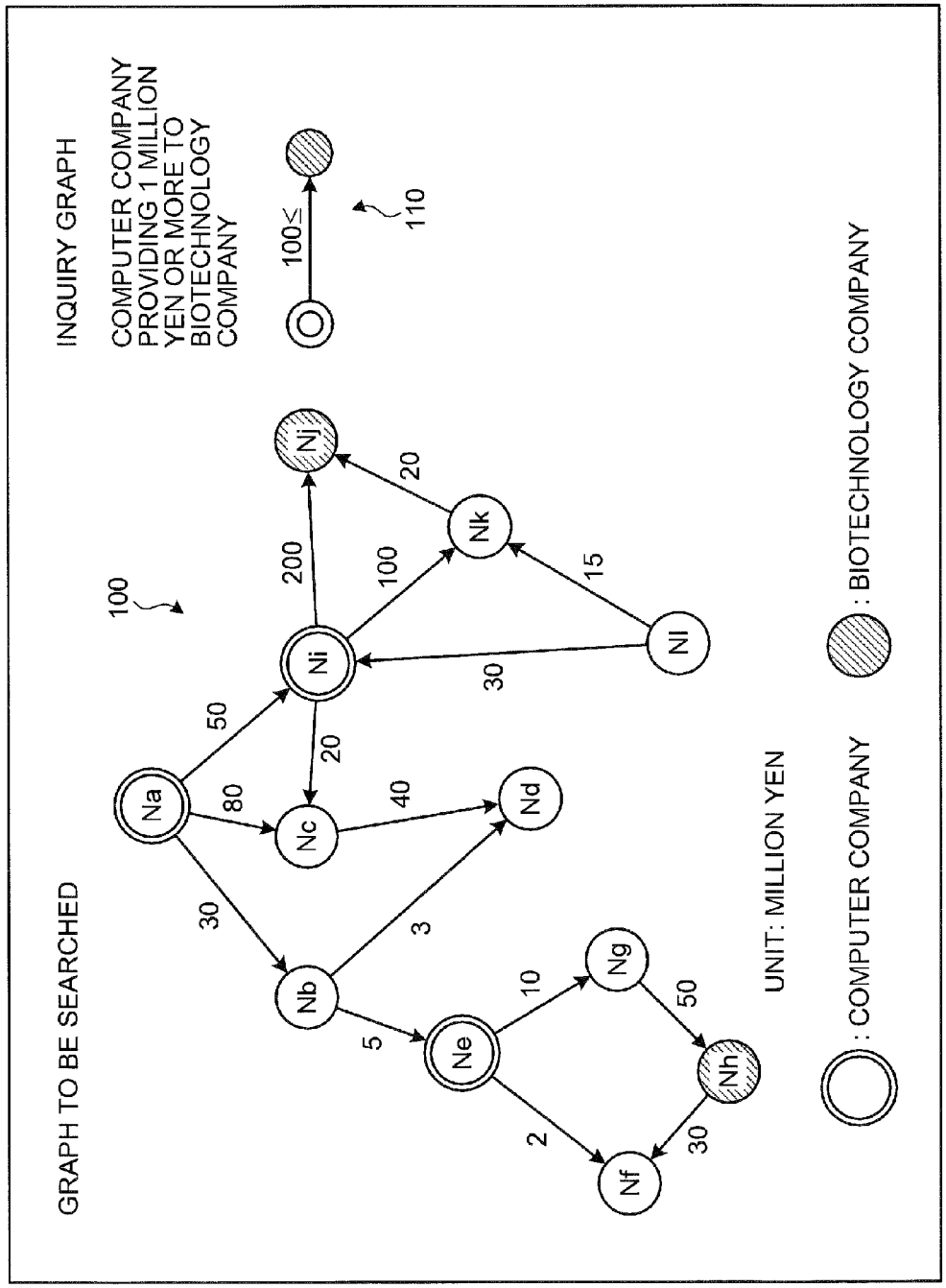
FIG. 4 is a view of an example of a graph to be searched and an inquiry graph.

FIG. 4 is a view of an example of a graph to be searched and an inquiry graph. As depicted in FIG. 4, the graph to be searched 100 represents the financing relationship between companies, which are denoted by nodes Na to Nl. Links between nodes consist of arrows and numerical values. Each arrow indicates which company finances what company while each numerical value (million yen) indicates the amount of financing provided. For example, the company Na finances the company Nb with 30 million yen.

The inquiry graph 110 is a graph that represents a user inquiry concerning the graph search and serves as a search condition. The inquiry graph 110 is indicative of a search condition where a computer company finances a biotechnology company with 100 million yen or more. This graph search is a process of retrieving a sub graph matching the inquiry graph 110 from the graph to be searched 100.

Figure 5:
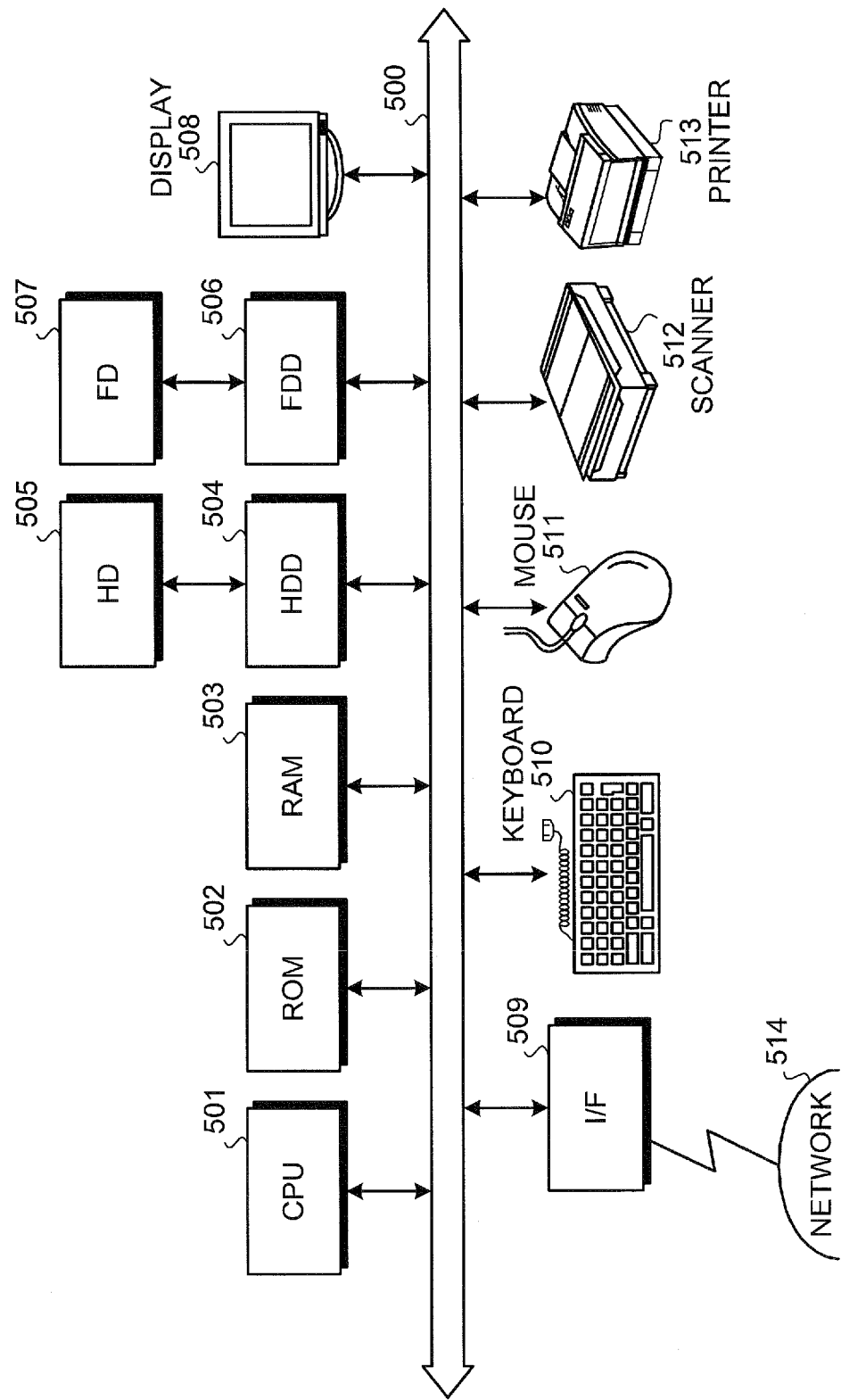
FIG. 5 is a block diagram of an information searching apparatus according to an embodiment of the present invention.

FIG. 5 is a block diagram of an information searching apparatus according to an embodiment of the present invention. The information searching apparatus includes a central processing unit (CPU) 501, a read-only memory (ROM) 502, a random access memory (RAM) 503, a hard disc drive (HDD) 504, a hard disc (HD) 505, a flexible disc drive (FDD) 506, a flexible disc (FD) 507 as an example of a removable recording medium, a display 508, an interface (I/F) 509, a keyboard 510, a mouse 511, a scanner 512, and a printer 513 that are interconnected via a bus 500.

The CPU 501 assumes overall control over the information searching apparatus. The ROM 502 stores therein a program such as boot program. The RAM 503 is used as a work area of the CPU 501. The HDD 504, under the control of the CPU 501, controls the reading/writing of data from/to the HD 505. The HD 505 saves data that is written thereto under the control of the HDD 504.

The FDD 506, under the control of the CPU 501, controls the reading/writing of data from/to the FD 507. The FD 507 saves data that is written thereto under the control of the HDD 506, and allows the information searching apparatus to read the data written thereto.

The FD 507 may be replaced with another removable recording medium, such as a compact disc read-only memory (CD-ROM (compact disc-recordable (CD-R), compact disc re-writable (CD-RW)), magneto optical disc (MO), digital versatile disc (DVD), and memory card. The display 508 displays a cursor, icons, tool boxes, data of documents, images, and functional information, etc. The display 508 is, for example, a cathode ray tube (CRT), thin-film-transistor (TFT) liquid crystal display, plasma display, etc.

The I/F 509 is connected to a network 514, such as the Internet, through a communication line, and is connected to another apparatus via the network 514. The I/F 509 assumes a function of interfacing the network 514 with internal components of the information searching apparatus, controlling data input/output from/to an external apparatus. The I/F 509 is, for example, a modem, LAN adaptor, etc.

The keyboard 510 has keys for entering characters, figures, various instructions, etc. and is used for data input. The keyboard 510 may be replaced with a touch panel input pad, numeric keypad, etc. The mouse 511 is used to move the cursor, select a range, shift and change sizes of a window. The mouse 511 may be replaced with a track ball, joy stick, etc., provided the device has the same pointing device function as that of the mouse.

The scanner 512 optically reads an image, and takes image data into the information searching apparatus. The scanner 512 may have an optical character recognition (OCR) function. The printer 513 prints image data and document data. The printer 513 is, for example, a laser printer or ink-jet printer.

Figures 6, 7:
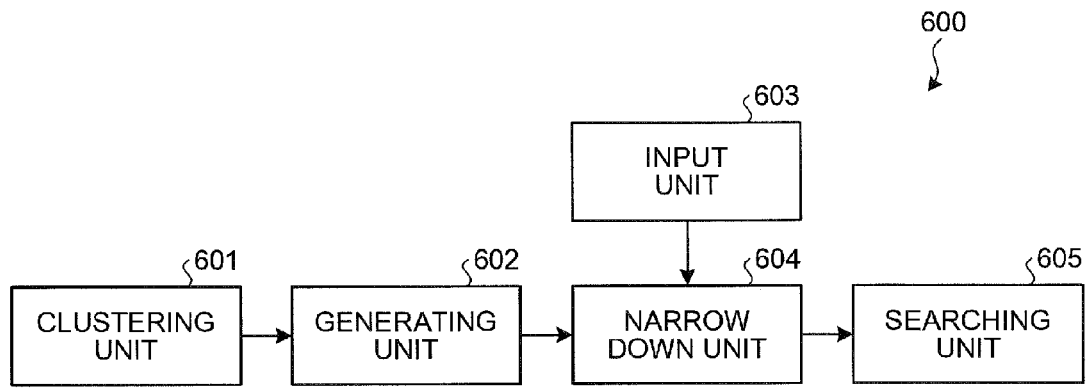
FIG. 6 is a functional diagram of the information searching apparatus.
FIG. 7 is a table depicting company data corresponding to the graph to be searched depicted in FIG. 4.

FIG. 6 is a functional diagram of the information searching apparatus. As depicted in FIG. 6, the information searching apparatus 600 includes a clustering unit 601, a generating unit 602, an input unit 603, a narrow down unit 604, and a searching unit 605. Specifically, the functions of these functional units are realized by, for example, causing the CPU 501 to execute a program stored on a memory unit, such as the ROM 502, the RAM 503, the HD 505, etc., or by executing a program distributed by the I/F 509.

In this embodiment, the overall process is divided into two stages including a generating process and a searching process. The generating process is the stage at which data for speeding up the searching process is generated. The generating process is equivalent to the process performed by the clustering unit 601 and the generating unit 602. The generating unit 602 exerts a function of generating an index using a technique used for a database and a search engine. Although the generating process usually takes time, execution of the generating process for every searching process is unnecessary as the initial execution of the generating process is sufficient. The generating process, therefore, does not affect the performance of the searching process. A database or a search engine operates similarly.

In the generating process, however, the process performed by the clustering unit 601 is not included in processes performed by an ordinary database or search engine. The searching process is the stage at which the result of the generating process is utilized to search the graph to be searched 100. The searching process is equivalent to the processes performed by the input unit 603, the narrow down unit 604, and the searching unit 605.

The basic idea of this embodiment is to speed up graph search by narrowing down clusters to those having a possibility of matching the inquiry graph 110 instead of searching among all the clusters for a cluster that matches, similar to looking for an object at a location where the possibility of finding the object is high rather than searching all locations. As shown in FIG. 1, a cluster including only a node of a computer company or a node of a biotechnology company has no potential of matching the inquiry graph. A cluster depicted by a thick lined circle that includes both companies, therefore, is identified first. After a cluster is identified, the cluster is searched.

A sub graph searched for may lie between clusters. In this embodiment, precision to the extent of including such a case may be sacrificed as the primary object of the present invention of faster search. Similarly, such application is found in operations by a search engine on the Internet. As further increases in the volume of information are expected, the tendency for such application will increase as the volume of data becomes greater.

The clustering unit 601 has a function of performing clustering on the graph to be searched 100. FIG. 7 is a table depicting company data corresponding to the graph to be searched 100 depicted in FIG. 4. FIG. 8 is a table depicting the relationship between financing companies and financed companies. The table depicted in FIG. 7 is referred to as a "node table", and the table depicted in FIG. 8 is referred to as a "link table".

With respect to the graph to be searched 100, the node table 700 indicates information concerning the nodes Na to Nl, while the link table 800 indicates information concerning the links. The contents of the node table 700 include node identifiers and company attributes, such as company names, addresses, and types of businesses. A node identifier is information that uniquely identifies a company. It is assumed that the graph to be searched 100 depicted in FIG. 4 is divided into three clusters as a result of clustering.

Figure 9:
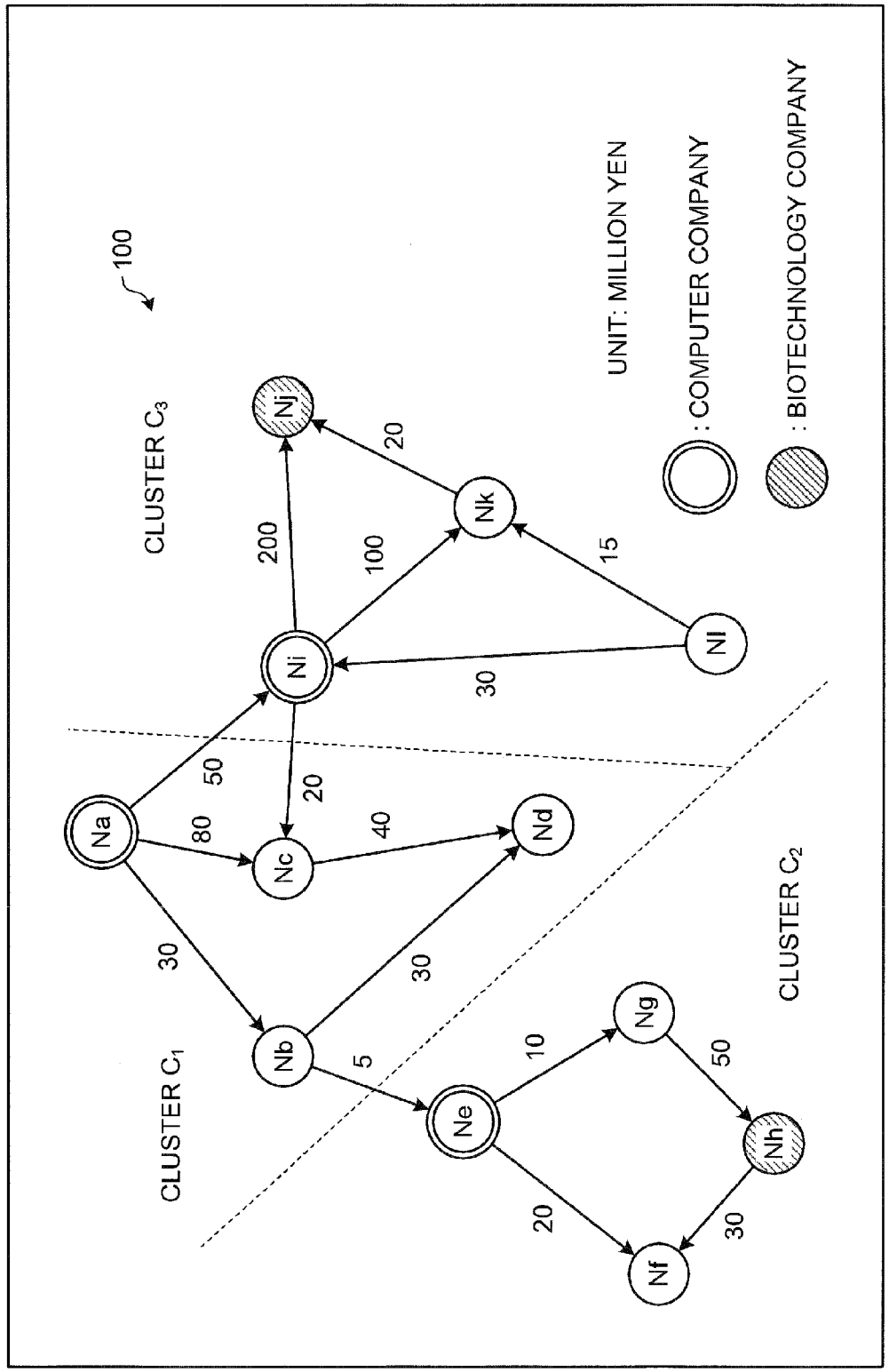
FIG. 9 is a schematic of a clustering result.

FIG. 9 is a schematic of a clustering result. As a result of clustering, the graph to be searched 100 is divided into clusters $C_1$ to $C_3$. This clustering clearly satisfies the terms (1-3) and (1-4) defining desired properties of clustering.

Figure 10:
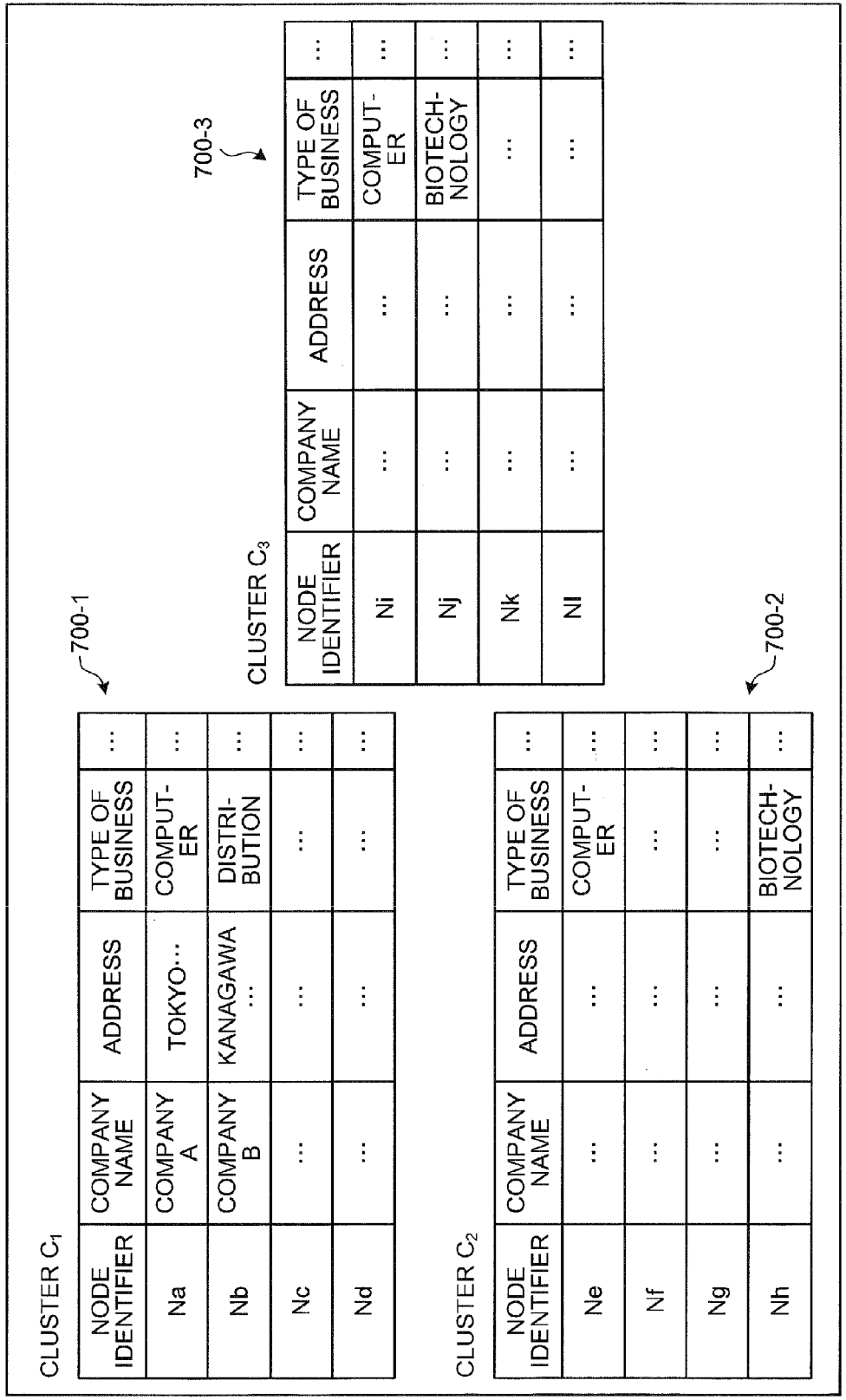
FIG. 10 is a schematic of separated node tables.

FIG. 10 is a schematic of separated node tables. Separated node tables 700-1 to 700-3 are tables that result when the node table 700 is separated into individual tables according to the clusters $C_1$ to $C_3$ depicted in FIG. 9. FIG. 11 is a schematic of separated link tables. Separated link tables 800-1 to 800-3 are tables that result when the link table 800 is separated into individual link tables according to the clusters $C_1$ to $C_3$ depicted in FIG. 9.

FIG. 12 is a view of a node table to which cluster identifiers have been added. A node table 1200 depicted in FIG. 12 is generated by adding cluster identifiers 1201 to corresponding nodes Na to Nl (depicted in the node table 700) included the clusters, respectively. For each node, the cluster including the node can be identified by performing clustering in such a manner.

The generating unit 602 has a function of generating an index for faster access to data. For example, a B-tree used by a database or a search engine may be used as the generating unit 602. An index is usually annexed to an attribute that is frequently used in a search. Thus, to perform the next narrowing down of clusters at high speed, an index is annexed to the type of business in the node table 1200 of FIG. 12.

Figure 13:
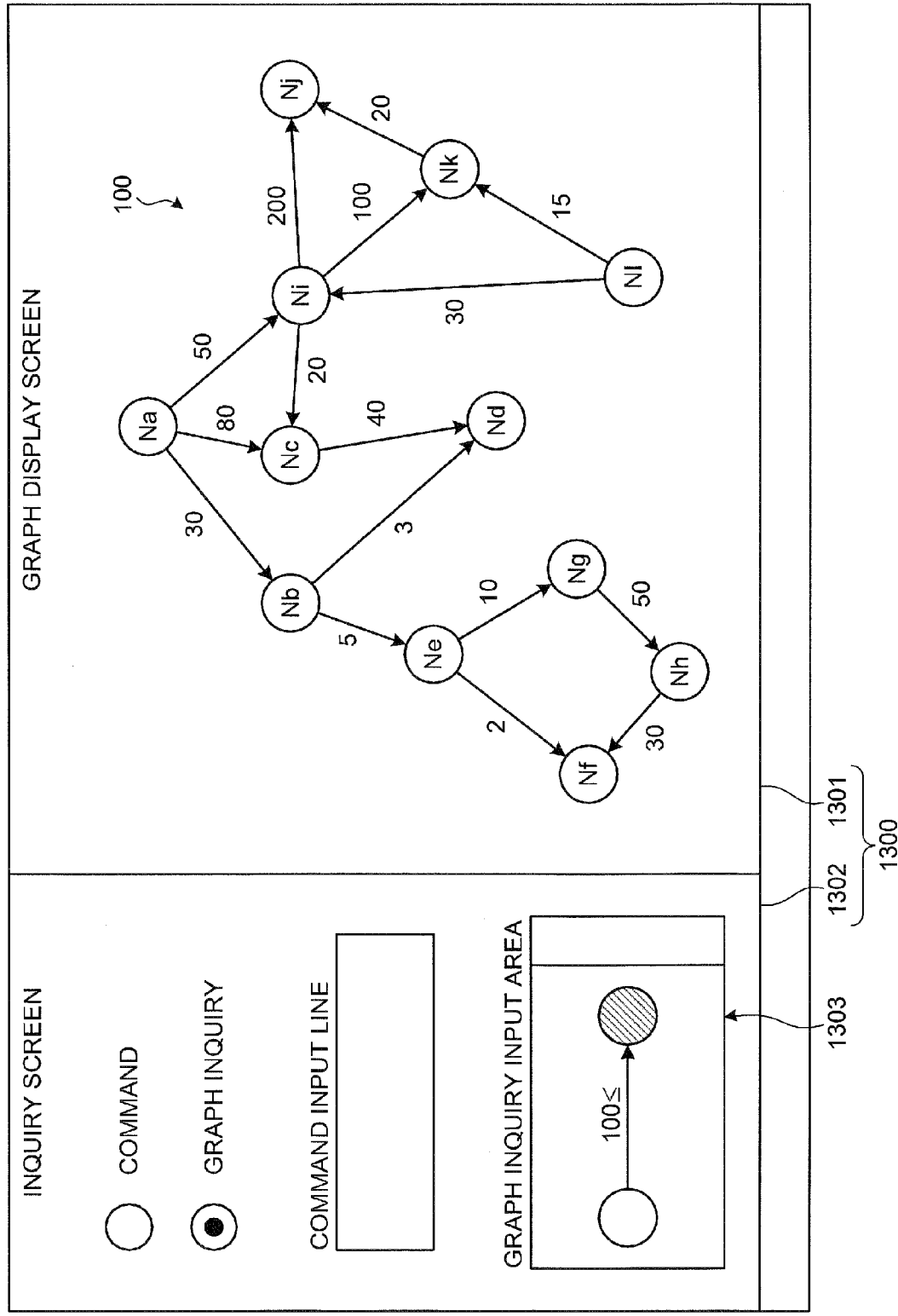
FIG. 13 is a view of a user interface.

The input unit 603 has a function of receiving input of the inquiry graph 110. FIG. 13 is a view of a user interface. As depicted in FIG. 13, the user interface 1300 includes a graph display screen 1301 and an inquiry screen 1302. On the graph display screen 1301, the graph to be searched 100 and a search result are displayed.

The inquiry screen 1302 is a screen on which an inquiry for graph search is performed. By selecting a radio button, the user can perform two types of searches implemented by the input of a command or by a graph inquiry. A command search is a command-based search using an inquiry language performed on an ordinary relational database. A graph inquiry is an inquiry that is made by visually expressing the inquiry in the form of a graph. A graph inquiry input area 1303 is an area where an inquiry graph is input.

Figure 14:
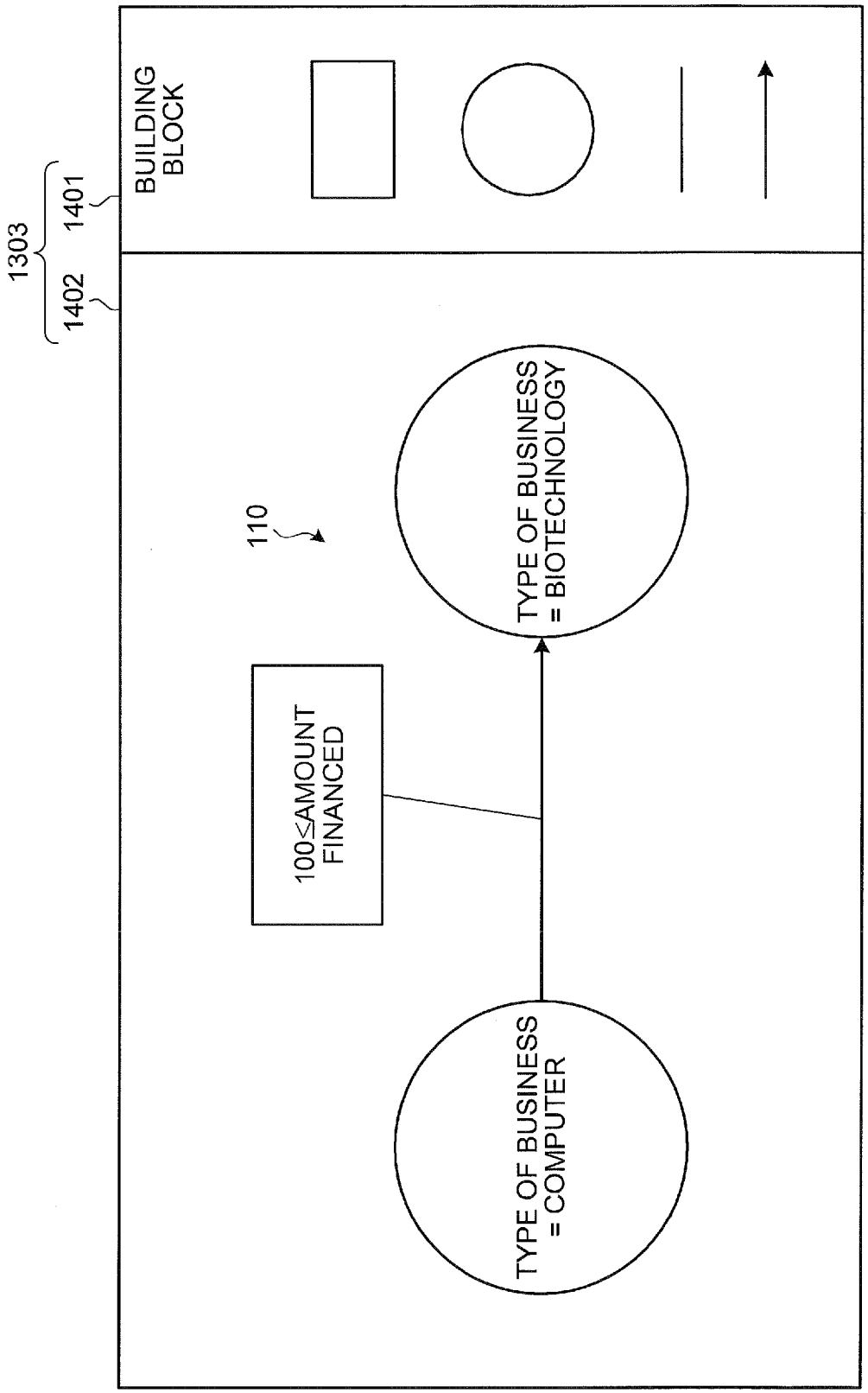
FIG. 14 is a view of a graph inquiry input area depicted in FIG. 13.

FIG. 14 is a view of the graph inquiry input area 1303 depicted in FIG. 13. A right area 1401 is a building block for making an inquiry. Shapes are moved from the right area 1401 to a left area 1402 to build the inquiry graph 110.

The narrow down unit 604 has a function of narrowing down, with the aid of a clustering result, the clusters to those having a potential of matching the inquiry graph 110. Specifically, for example, a condition J concerning the attribute of a node in the inquiry graph 110 and the node table 1200 to which the index is annexed are used first to identify a node identifier and a cluster identifier for a node that satisfies the condition J. For example, if the condition J is the type of business, the node identifier for a node whose type of a business is "computer" can be identified in the node table 1200 depicted in FIG. 12. At the same time, based on a cluster identifier on the same line as the node identifier, a cluster can also be identified.

If plural conditions J are given, a cluster can be identified in a further narrowed down range. Suppose that the inquiry graph 110 requires simultaneous satisfaction of conditions J1 (e.g., type of business is computer) and J2 (e.g., type of business is biotechnology), and that clusters satisfying the condition J1 include clusters $C_1$ and $C_2$ and clusters satisfying the condition J2 include clusters $C_2$ and $C_3$.

When only one of the conditions J1 or J2 is used, the clusters can be narrowed down to two clusters. On the other hand, if the logical product of the two conditions J1 and J2 is calculated, the clusters having a potential of matching the inquiry graph 110 can be narrowed down to one cluster that satisfies both conditions simultaneously. Specifically, for example, a condition expressed by the inquiry graph 110 is converted into the following form (sum/product standard form) without fail.

Condition J1 and condition J2 and . . . and condition Ji and . . . and condition Jn (where condition Ji is a logical expression including only "or" or "not", and $1 \leq i \leq n$ is satisfied with n denoting the number of conditions).

Among these conditions J1 to Jn, conditions enabling high speed node searching by the use of the node table 1200 and the index are selected. A selected condition is referred to as a "node condition". With respect to the condition Ji, a node condition $NJi_1$, a node condition $NJi_2$, . . . , a node condition $NJi_m$ are selected ($1 \leq i_1 < i_2 < \ldots < i_m \leq n$, where $m \leq n$ is satisfied with m denoting the number of node conditions). The node table 1200 may be provided as plural tables for a general inquiry.

For each node condition $Nji_j$ ($1 \leq j \leq m$), a work table $ncWi_j$ (hereinafter "node/cluster identifier table") including node identifiers and cluster identifiers that are included in lines satisfying the node condition $Nji_j$ is generated from the node table 1200.

Figure 15:
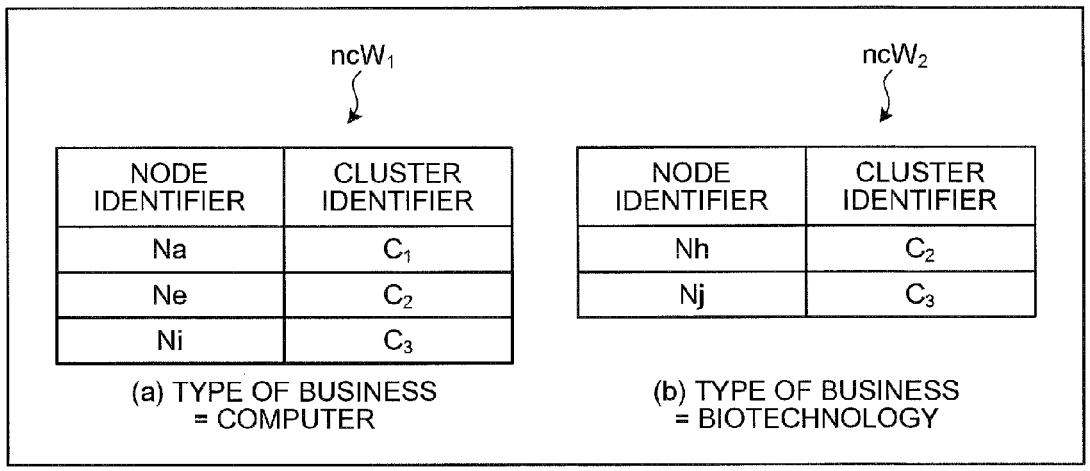
FIG. 15 is a view of a node/cluster identifier table.

FIG. 15 is a view of the node/cluster identifier table $ncWi_j$. As depicted in FIG. 15, a node/cluster identifier table $ncWi_1$ is a table generated for a condition that the type of business is "computer". The node/cluster identifier table $ncWi_1$ is generated by extracting lines in which the type of business is computer from the node table 1200 depicted in FIG. 12. Further, a node/cluster identifier table $ncWi_2$ is a table generated for a condition that the type of business is "biotechnology". The node/cluster identifier table $ncWi_2$ is generated by extracting lines in which the type of business is biotechnology from the node table 1200.

Common clusters are identified. Specifically, cluster identifiers common to node/cluster identifier tables $ncWi_1$, $ncWi_2$, . . . , $ncWi_j$, . . . , $ncWi_m$ are obtained, and the obtained cluster identifiers are stored in a work table cW referred to as "cluster identifier table".

Figure 16:
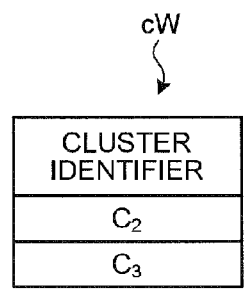
FIG. 16 is a view of a cluster identifier table.

FIG. 16 is a view of the cluster identifier table cW. If necessary, for a search process by the searching unit 605, a node identifier table $nWC_k$ is generated for each common cluster by collecting the node identifier that corresponds to the cluster identifier for each common cluster in the node/cluster identifier tables $ncWi_1$, $ncWi_2$, . . . , $ncWi_j$, . . . , $ncWi_m$. $C_k$ denotes the identifier for a common cluster.

Figure 17:
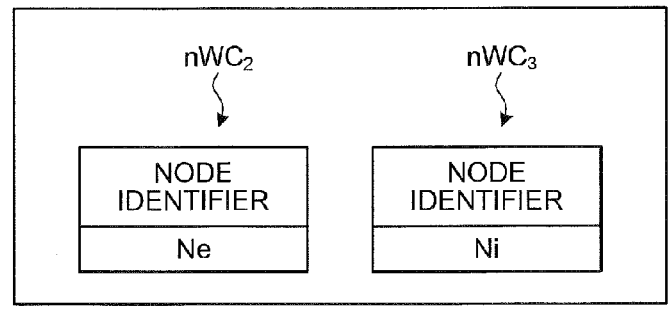
FIG. 17 is a view of a node identifier table.

FIG. 17 is a view of the node identifier table $nWC_k$ generated for one of the node conditions Njij. As depicted in FIG. 17, the node identifier table $nWC_k$ is generated for the node condition $Nji_j$ that the type of business is computer. The obtaining of a common node identifier is equivalent to calculation of a common portion of two sets, which is performed according to a known method. The common node identifier, therefore, can be calculated using the known method. When the cluster identifier table cW is stored on a main memory, high-speed calculation using the hashing method is possible.

For example, when a search is performed on the graph to be searched 100 of FIG. 4, nodes at which the type of business is computer and the cluster identifiers in the lines including those nodes are retrieved from the node table 1200 of FIG. 12, as depicted in node/cluster identifier table $ncW_1$ in FIG. 15. In the same manner, nodes at which the type of business is biotechnology and cluster identifiers in the lines including those nodes are retrieved, as depicted in node/cluster identifier table $ncW_2$ in FIG. 15.

Cluster identifiers common to both node/cluster identifier tables $ncW_1$ and $ncW_2$ in FIG. 15 are then retrieved to acquire the cluster identifier table cW depicted in FIG. 16 as a search result. Through this process, clusters to be searched are narrowed down to the clusters depicted in the cluster identifier table cW. If necessary for the searching unit 605, node identifier tables $nWC_2$ and $nWC_3$ depicted in FIG. 17 are generated. As depicted in FIG. 17, the node identifier tables $nWC_2$ and $nWC_3$ are generated for a node condition that the type of business is computer.

In this manner, according to this embodiment, clusters are narrowed down using the node condition $NJi_j$. A sub graph matching the inquiry graph 110 other than a sub graph resulting from narrowing down of clusters, however, may also be present. For example, a sub graph matching the inquiry graph 110 may lie between two clusters. The method of this embodiment is not necessarily able to cover every conceivable search result, but offers a possibility of substantially improving search speed, compared to the execution of "join" used on a conventional RDB.

This means that while a search conventionally performed on an RDB seeks a complete solution, the method of this embodiment seeks not a complete solution but an approximate solution. Every search result may be demanded in some cases depending on the type of practical application. In many cases, however, the demand for quick retrieval of even one solution that satisfies a condition is predominant. Actually, searching for some top 10 cases satisfying a condition constitutes the majority of searches using a search engine. In the field of business, cases of searching all information satisfying a condition are relatively few in atypical fields, such as research activities. The embodiment of the present invention is aimed at such fields of applications.

The searching unit 605 searches clusters narrowed down by the narrow down unit 604 for a sub graph matching the inquiry graph 110. Specifically, the searching unit 605 searches for, for example, a sub graph that completely matches the inquiry graph 110.

More specifically, a cluster is considered to be one form of a graph, which means that although the size of a problem is smaller in a cluster level, the problem is still handled in the same way as a conventional problem. Finding an exact solution by applying a conventional RDB method to clusters, therefore, is possible.

As depicted in FIG. 17, node identifiers are obtained enabling the acquisition of a search result by utilizing the obtained node identifiers. Specifically, based on the node identifier table $nWC_k$, a node satisfying one of the node conditions $NJi_j$ is identified in a cluster. Then, it is determined whether nodes and links surrounding the identified node satisfy the condition of the inquiry graph 110.

The description above is applicable to the search example depicted in FIG. 4, which will be explained as an example of implementation. The node identifier table $nWC_k$ is assumed to be determined in advance. Clusters are narrowed down from the clusters $C_1$ to $C_3$ to the clusters $C_2$ to $C_3$, using the cluster identifier table cW of FIG. 16, so that the clusters $C_2$ to $C_3$ are searched precisely.

A case of searching the cluster $C_2$ will be described first. Based on the node identifier table $nWC_2$ depicted in FIG. 17, the node Ne is searched. No biotechnology company node is present around the node Ne (where linked nodes are located); hence, the node Ne does not match the inquiry graph 110. The cluster $C_2$, therefore, does not include a solution.

A case of searching the cluster $C_3$ is described. Similarly, the node Ni is searched based on the node identifier table $nWC_3$. The node Nj representing a biotechnology company is present around the node Ni (where linked nodes are located), which invests 200 million yen in the company represented by the node Nj. This situation matches the condition of the inquiry graph 110. Hence, the sub graph including the nodes Ni and Nj and a link between them is the solution sought.

The clustering unit 601 is described in detail. A network theory has been attracting attention since the year 2000. This theory states the following.

(2-1) Most networks in the natural world have a property that the number of links originating from a node follows the power law. This means that nodes with lower orders (i.e., number of links originating from the node) are greater in number while nodes with higher orders are less in number. A node with an order higher than that of surrounding nodes is referred to as a hub.

(2-2) It is said that a network satisfying the term (2-1) easily collapses when the network's hub comes under attack. Typical instances of such a network are numerous, including the Web, computer networks, airline networks, food chains, and human relations.

Figure 18:
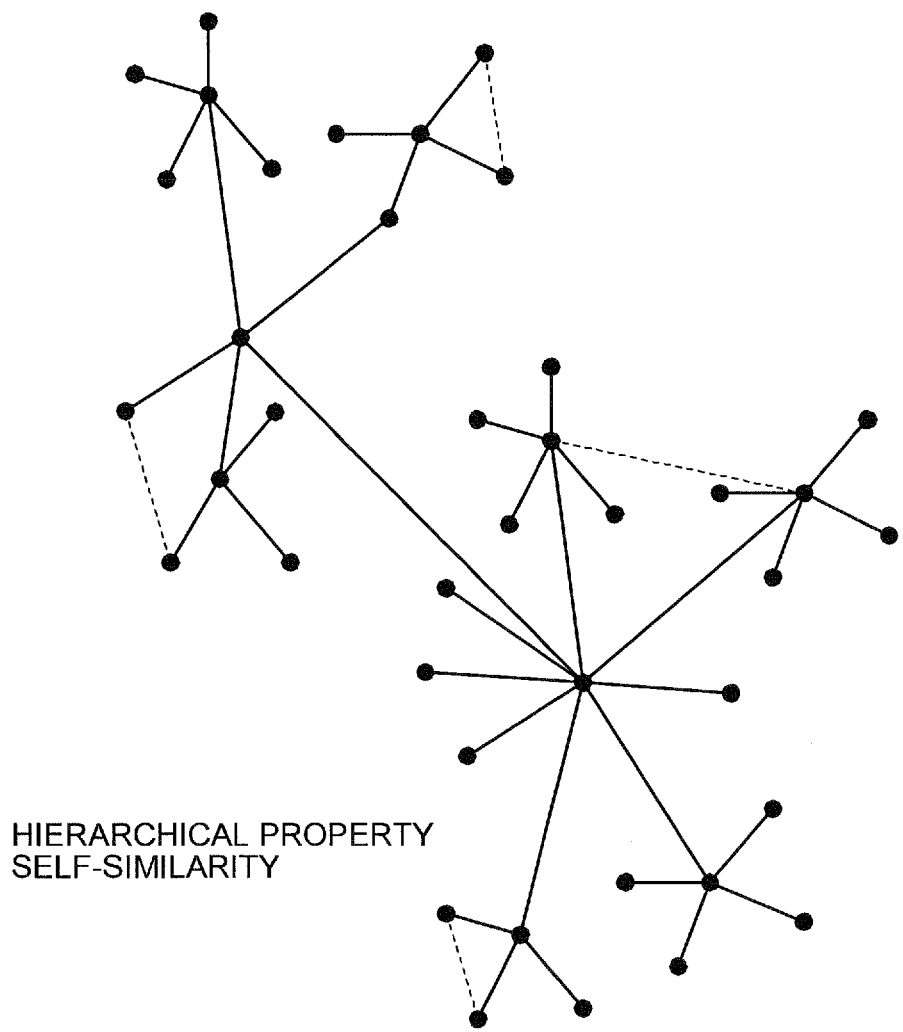
FIG. 18 is a view of a network.
Figure 19:
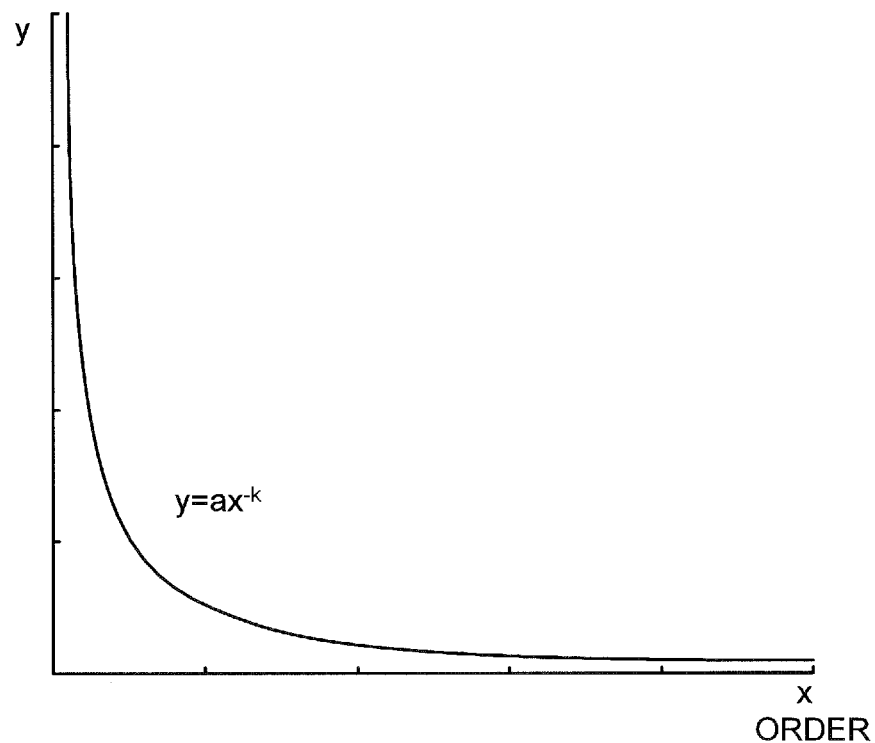
FIG. 19 is a graph depicting a scale-free state.

FIG. 18 is a view of a network. This network (graph) explains the term (2-1). A graph that satisfies the term (2-1) is referred to as scale-free graph. The Web was found to be scale-free around the year 2000, after which many other networks in the natural world and society have also been found to be scale-free. FIG. 19 is a graph depicting a scale-free state. This graph follows the power law stated in the term (2-1).

Figure 20:
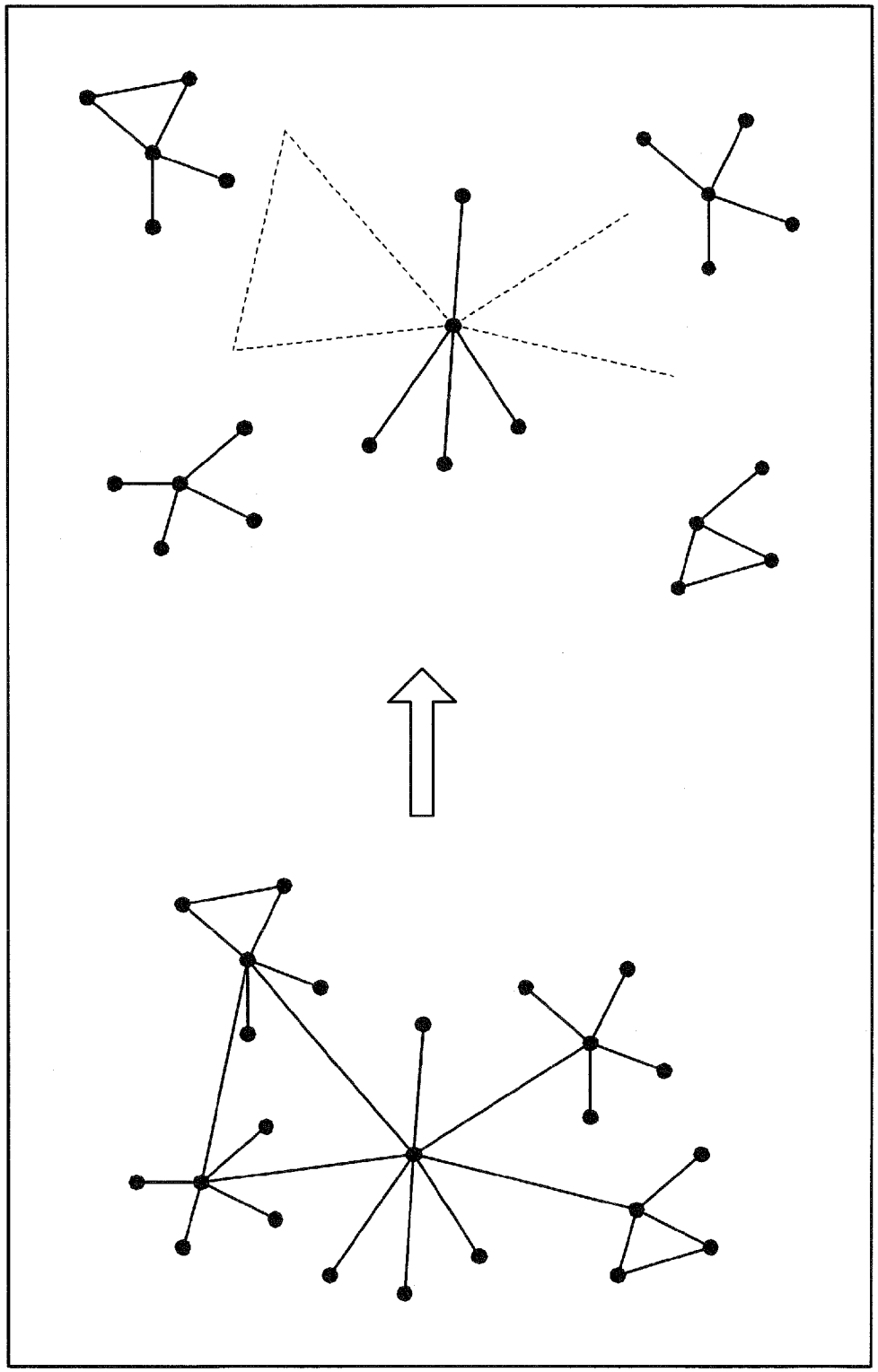
FIG. 20 is a diagram of an example of disintegration of the network depicted in FIG. 18.

FIG. 20 is a diagram of an example of disintegration of the network depicted in FIG. 18 and is for explaining the term (2-2). In FIG. 20, the network (graph) of FIG. 18 is disintegrated about a hub. Links represented by dotted lines after disintegration in FIG. 20 indicate links that extend between hubs in FIG. 18. On the Web, nodes with a great number of links, such as a search engine, are extremely few while nodes with fewer links are greater in number, so that the distribution of nodes follows the power law. The same holds true for an airline network. If a large-scale airport like the Narita International Airport goes out of flight service in an airline network, the airline network becomes paralyzed in many places. The premise above is utilized in this embodiment, in which a cluster is constructed around a hub.

Basically, a graph composed of n nodes is taken to be a graph composed of n clusters, so that one node is included in each cluster. Then, two adjacent clusters are selected from among the n clusters, and are merged into one cluster to reduce the total number of clusters. This process is repeated to reduce the number of clusters of the graph to m which is a desired number of clusters. A merged cluster records information concerning nodes and links of all clusters merged up to the merged cluster.

A sub graph composed of nodes and links that are merged into a cluster is the sub graph corresponding to the cluster. The problem is determining which two adjacent clusters are to be selected. A flow of the clustering process is as follows.

(3-1) First, the graph to be searched 100 composed of n nodes is regarded as a graph composed of n clusters.

(3-2) An uncalculated cluster pair $\{C_p, C_q\}$ is then extracted (extraction function). A pair of clusters linked via a link is extracted as the cluster pair $\{C_p, C_q\}$.

(3-3) Subsequently, the bonding strength $f_{pq}$ between the clusters is calculated for the extracted cluster pair $\{C_p, C_q\}$, using the following equation (calculation function).

$$f_{pq} = \frac{l(C_p, C_q)^\lambda}{n(C_p)^\nu \times n(C_q)^\nu \times d(C_p)^\delta \times d(C_q)^\delta} \quad (1)$$

In the equation, $n(C_p)$ denotes the number of nodes in the cluster $C_p$, $n(C_q)$ denotes the number of nodes in the cluster $C_q$, $d(C_p)$ denotes the order of the cluster $C_p$, and $l(C_p, C_q)$ denotes the number of links linking together the clusters $C_p$ and $C_q$. $\nu$, $\delta$, and $\lambda$ denote adjustment coefficients, and are each equal to 1 when no priority is given to any one of $\nu$, $\delta$, and $\lambda$.

(3-4) Based on the bonding strength $f_{pq}$ of each cluster pair, a pair of clusters to be merged is determined (determination function). For example, the cluster pair $\{C_p, C_q\}$ having the maximum bonding strength $f_{pq}$ is determined to be the cluster pair to be merged.

(3-5) The cluster pair $\{C_p, C_q\}$ determined to be the cluster pair to be merged is merged into one cluster $C_{pq}$ (merging function). Upon merging, necessary graph modification is performed. If plural cluster pairs having the same bonding strength $f_{pq}$ are present, any one of the pairs is selected arbitrarily.

(3-6) The processes described in (3-2) to (3-5) are repeated until the number of clusters is reduced to the desired number m (<n) (determination function). A proper number may be adopted as the number m when the proper number is given by application software. If m is too small, the effect of the narrowing down process becomes small. If m is too large, on the contrary, the size of each cluster becomes small, which increases the possibility that a search subject lies between clusters. A selection made balancing such factors is, therefore, preferable. For example, m may be determined by a square root calculation (m=√n), or when the proper size of a cluster is z, m may be determined to be n/z.

The necessary graph modification stated in term (3-4) of the flow above is the following operation. Suppose the cluster pair $\{C_p, C_q\}$ is merged into the cluster $C_{pq}$. In this case, a link from a cluster $C_r$ (exclusive of the clusters $C_p$ and $C_q$) to the clusters $C_p$ or $C_q$ is considered to be the link from the cluster $C_r$ to the cluster $C_{pq}$. Likewise, a link from the clusters $C_p$ or $C_q$ to the cluster $C_r$ is considered to be the link from cluster $C_{pq}$ to the cluster $C_r$. When s links and t links extend from the cluster $C_r$ to the clusters $C_p$ and $C_q$, s+t links remain between the cluster $C_r$ and cluster $C_{pq}$.

In the cluster $C_{pq}$, subgraphs in the clusters $C_p$ and $C_q$ and a sub graph composed of links between the clusters $C_p$ and $C_q$ are recorded. Since a cluster appears as one node on the graph, the record above is not visible on the graph. The links between the clusters $C_p$ and $C_q$, therefore, also become invisible as result of merging.

Merging the clusters $C_p$ and $C_q$ does not cause a change in the link relationship between any other pairs of clusters besides the clusters $C_p$ and $C_q$, and does not cause a change in the order of an arbitrary cluster $C_r$ other than clusters $C_p$ and $C_q$. Once calculation of the bonding strength of every cluster pair is finished, the uncalculated cluster pair stated in the term (3-2) of the flow of clustering process specifically means a cluster pair that consists of the merged cluster $C_{pq}$ a cluster linked thereto.

FIGS. 21 to 24 are views of examples of clustering calculations. Each example depicts degeneracy from an initial state (1) to a final state (7). Each of numerals shown in FIGS. 21 to 24 represents the reciprocal (1/f) of f that denotes bonding strength. As the bond strength f is a decimal value, the bonding strength is expressed as the reciprocal (1/f) to simplify the figures.

Figure 21:
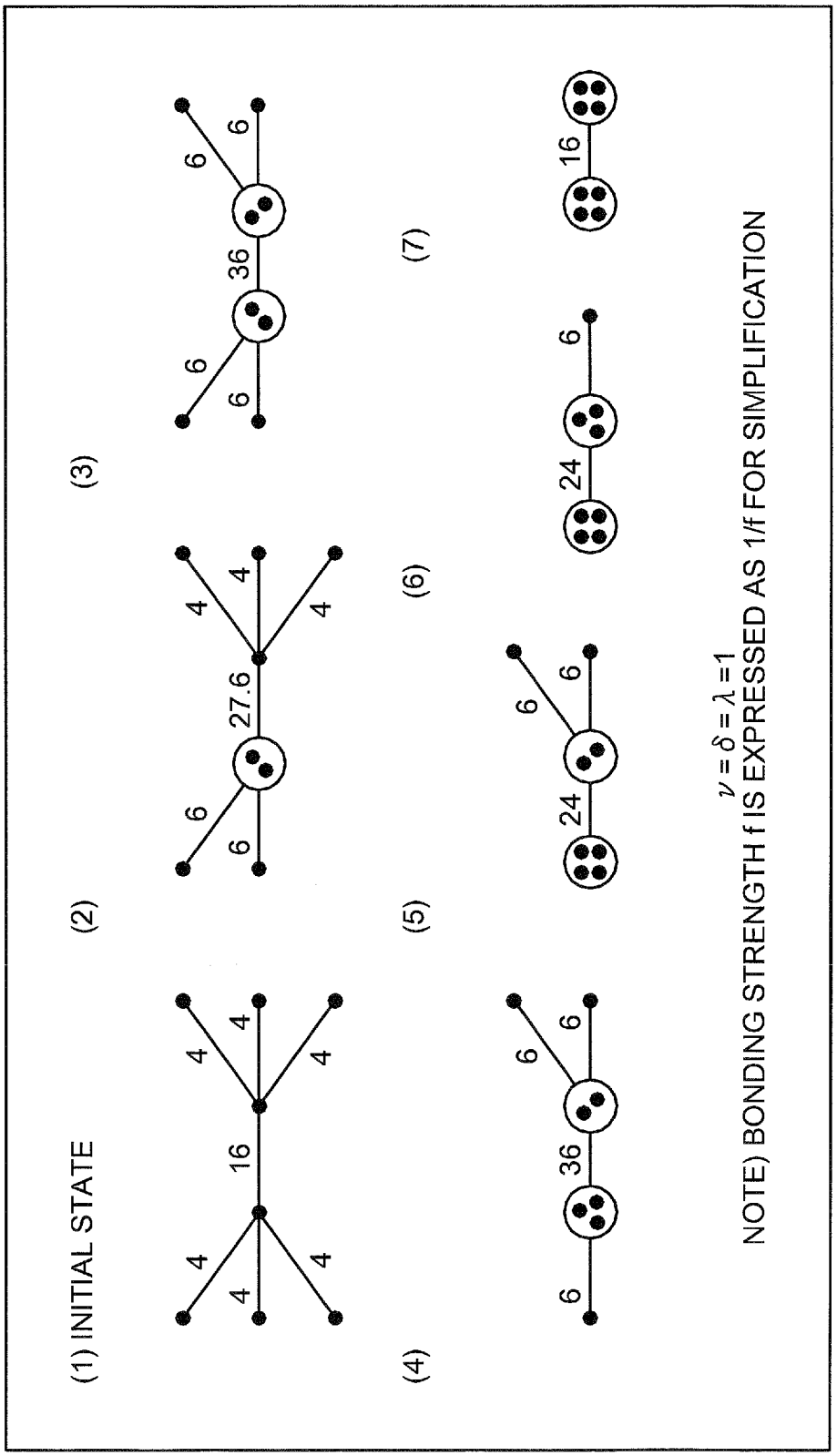
FIGS. 21 to 24 are views of examples of clustering calculations.
Figure 22:
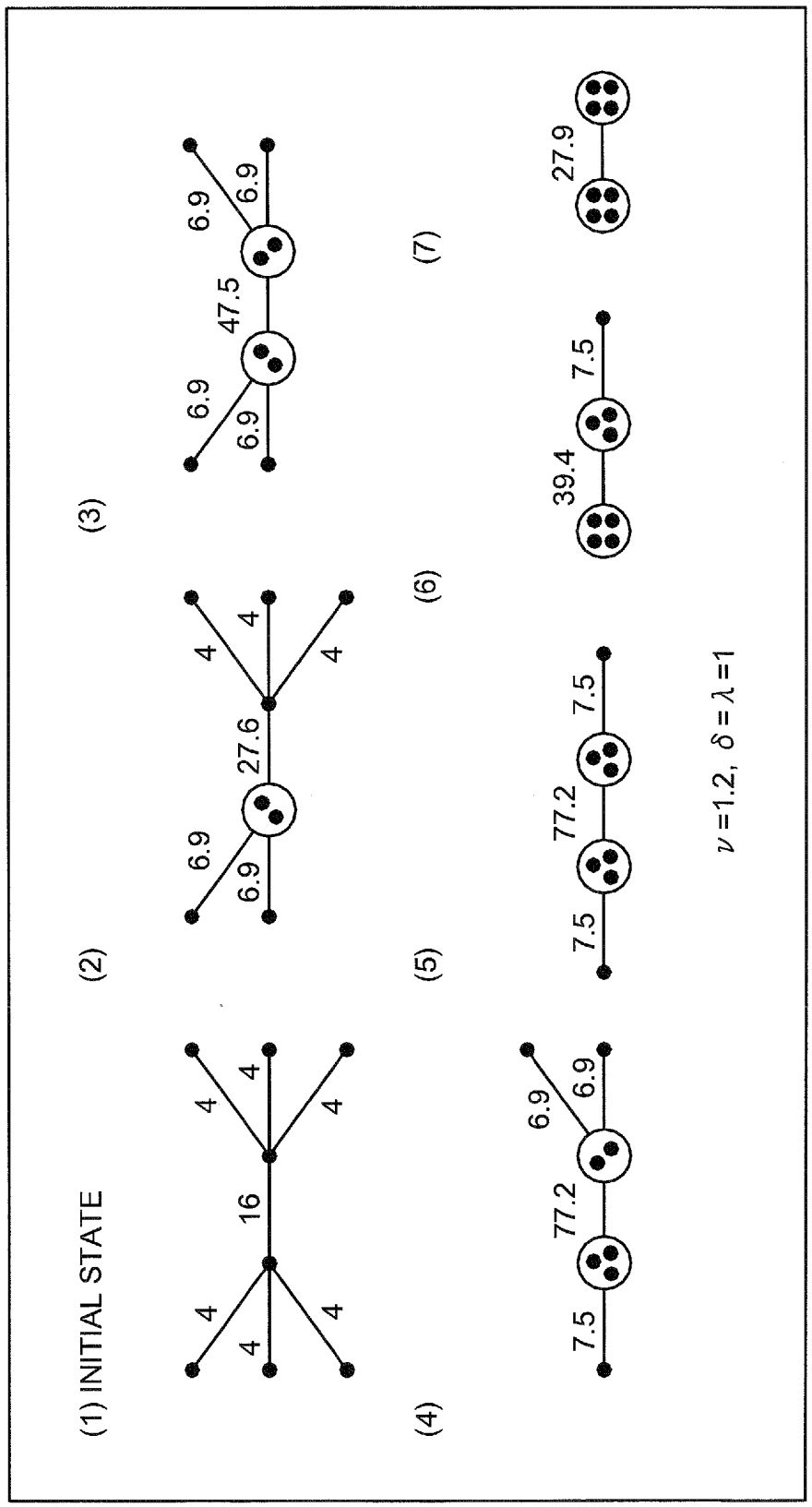

FIGS. 21 and 22 depict examples of simple tree-shaped networks. In FIG. 21, the adjustment coefficients are determined to be ν=δ=λ=1, which is the simplest form, while in FIG. 22, the coefficient ν is determined to be 1.2. Expected clustering is performed in FIG. 22, where two cluster pairs having the same bonding strength do not appear. On the contrary, in FIG. 21, three cluster pairs each having the reciprocal 6 of the bonding strength appear at the state (4), and the left cluster pair is selected, which leads to a clustering result that does not meet expectations. Selecting either of the two right cluster pairs would bring an expected clustering result as shown in FIG. 22.

To select an optimum cluster pair among cluster pairs having the same bonding strength requires optimization from a global point of view, thus leading to a cost increase. For this reason, no global optimization is performed in this embodiment. An advantage that bonding strength offers is enabling calculation based on local information. The reason for adding the adjustment coefficients is based on an idea that the number of nodes, orders, and the number of links do not each have the same weight, and to prevent the appearance of the same numerical value as much as possible.

The coefficients ν, λ, and δ are weighting parameters, and if the specific values of these coefficients are given by application software, such values are used as the coefficients ν, λ, and δ. In general, however, the setting of the coefficients ν, λ, and δ is not known in many cases. If setting of the coefficients ν, λ, and δ is not known, each of ν, λ, and δ is determined to be approximately 1. In consideration of preventing the appearance of the same numerical value, however, the coefficients ν, λ, and δ are determined to be slightly different from each other.

Figure 23:
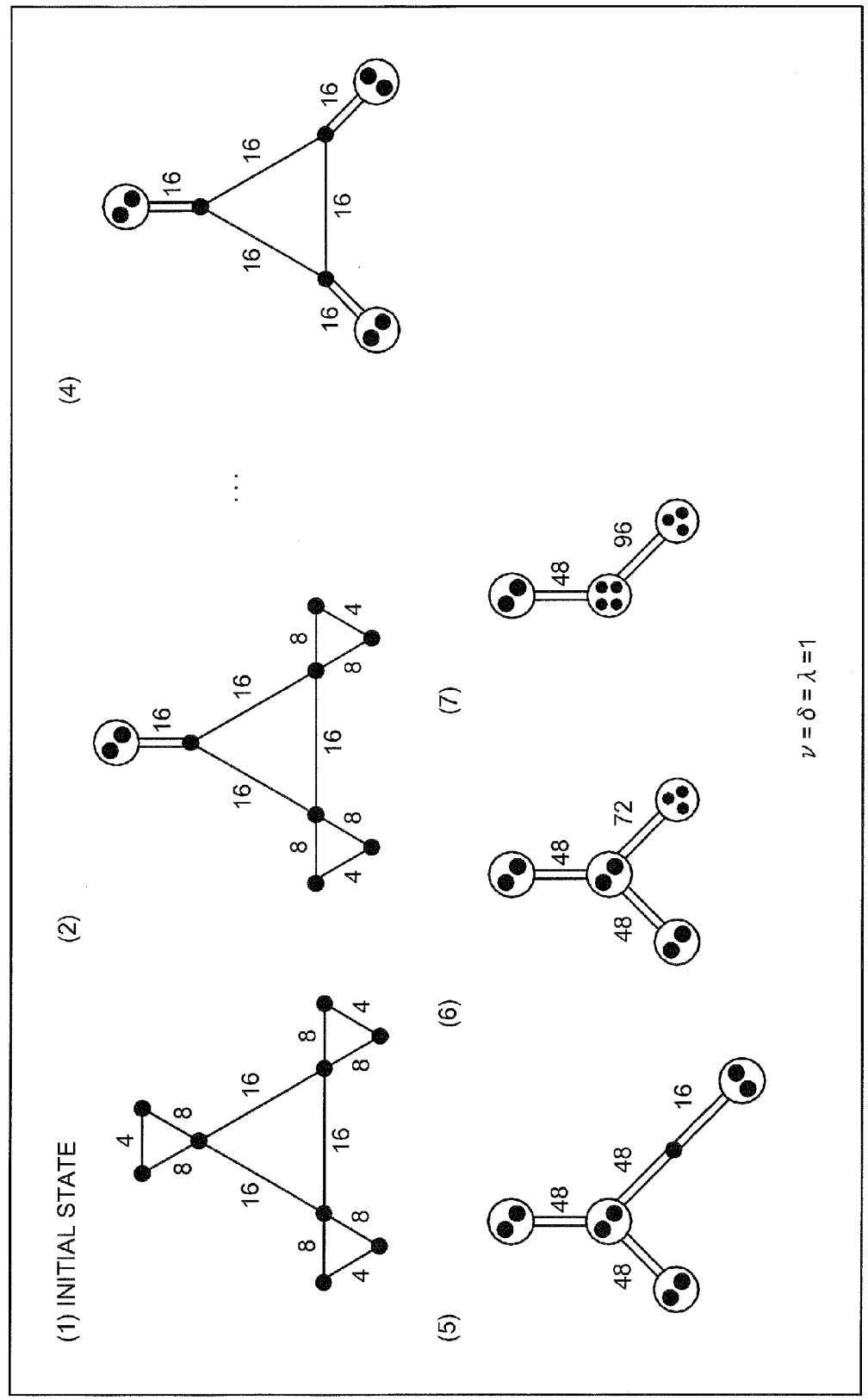
Figure 24:
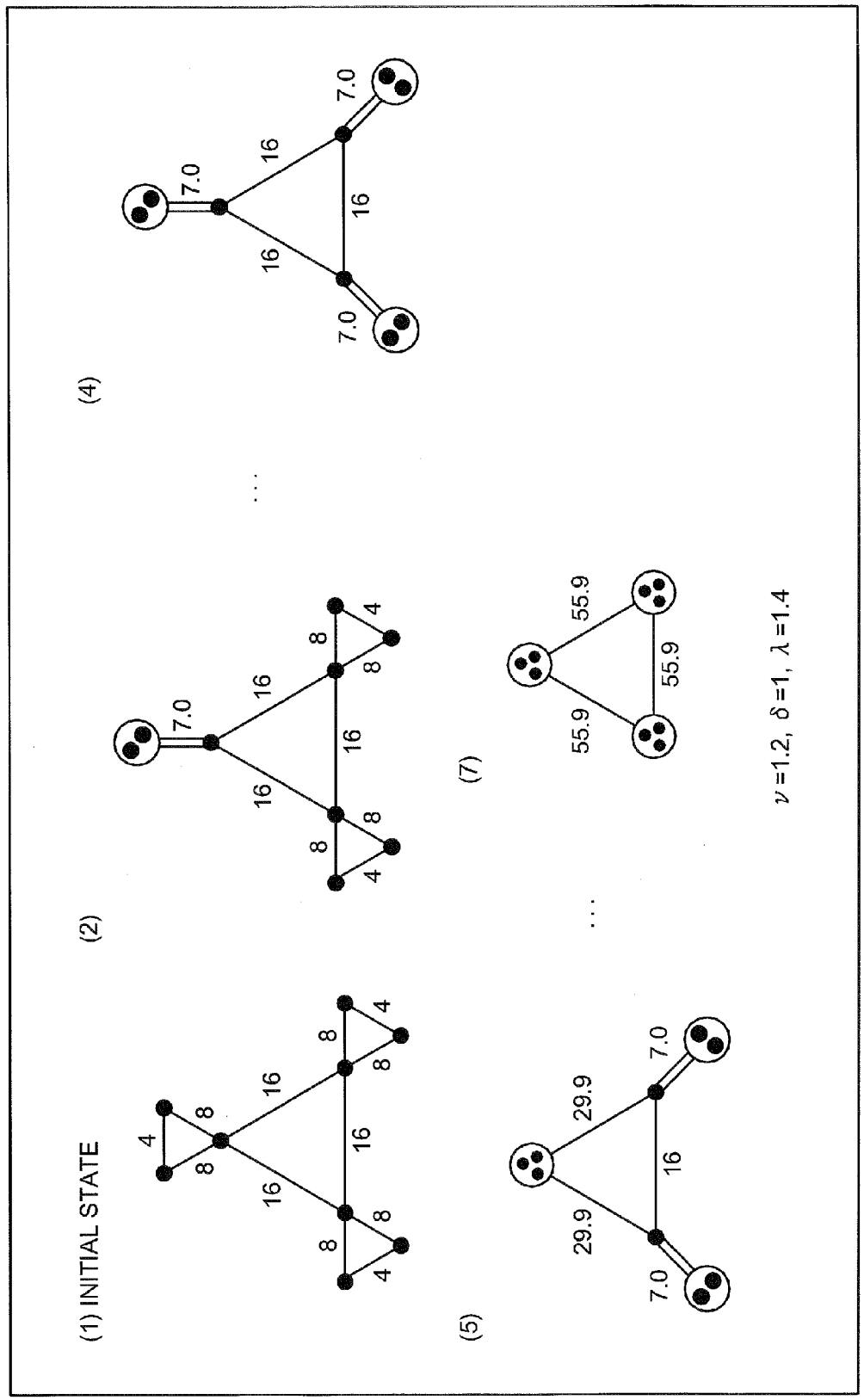

FIG. 23 depicts an example of a network including simple circuits. As depicted in FIG. 23, the adjustment coefficients ν, λ, and δ are determined to be the simplest form of ν=δ=λ=1. As depicted in FIG. 24, two adjustment coefficients ν and λ are ν=1.2 and λ=1.4. Expected clustering is performed in FIG. 24, while in FIG. 23, the reciprocal of each bonding strength is 16 at the state (4), and clusters pairs with the bonding strength making up the sides of a central triangle are selected for merging, which brings about a clustering result that does not meet expectations. Selecting a cluster pair having a bonding strength other than the bonding strength making up a side of the triangle would lead to expected clustering as shown in FIG. 24 after the state (4).

As shown in the states (4) and (5) in FIG. 21 or of (4) and (5) in FIG. 23, the present method does not ensure constant execution of optimum clustering. In FIGS. 21, 22, and 24, however, desirable optimum clustering results in the final state as expected. The final clustering result depicted in FIG. 23 includes one redundant link in total and is slightly inferior in balance, compared to the result of optimum clustering, but is considered to be the result of satisfactory clustering.

Figure 25:
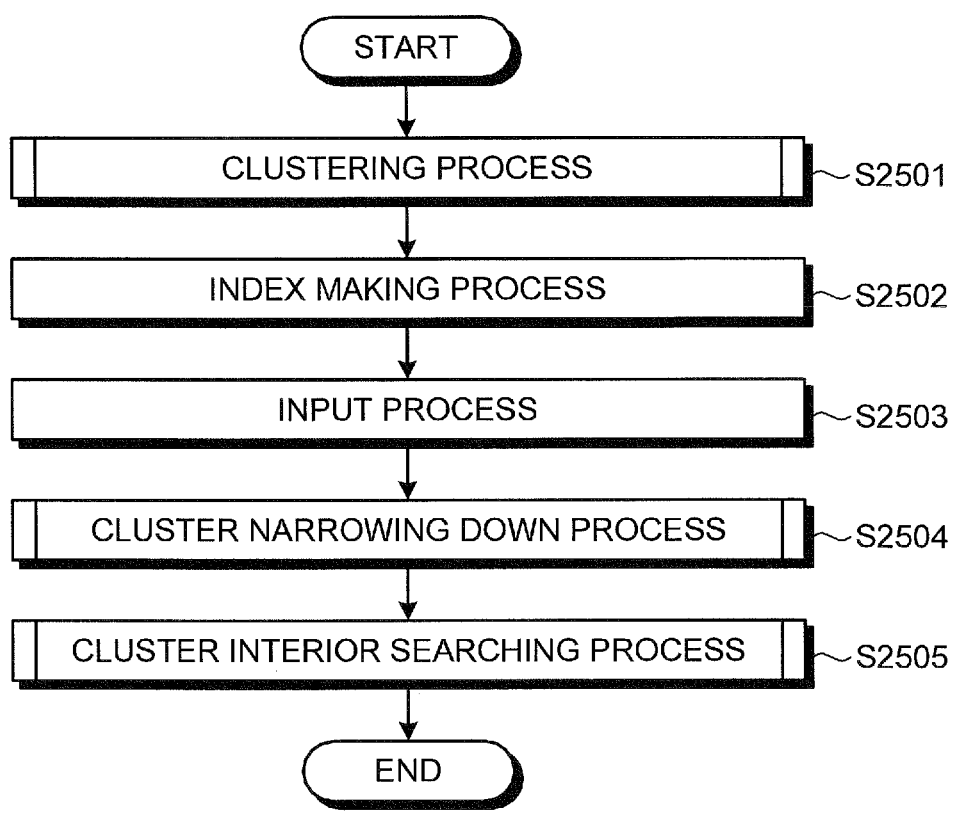
FIG. 25 is a flowchart of an information searching procedure performed by the information searching apparatus.

FIG. 25 is a flowchart of an information searching procedure performed by the information searching apparatus 600 of this embodiment. As depicted in FIG. 25, the clustering process by the clustering unit 601 (step S2501), the index generating process by the generating unit 602 (step S2502), the input process by the input unit 603 (step S2503), the cluster narrowing down process by the narrow down unit 604 (step S2504), and the cluster interior searching process by the searching unit 605 (step S2505) are executed successively.

Figure 26:
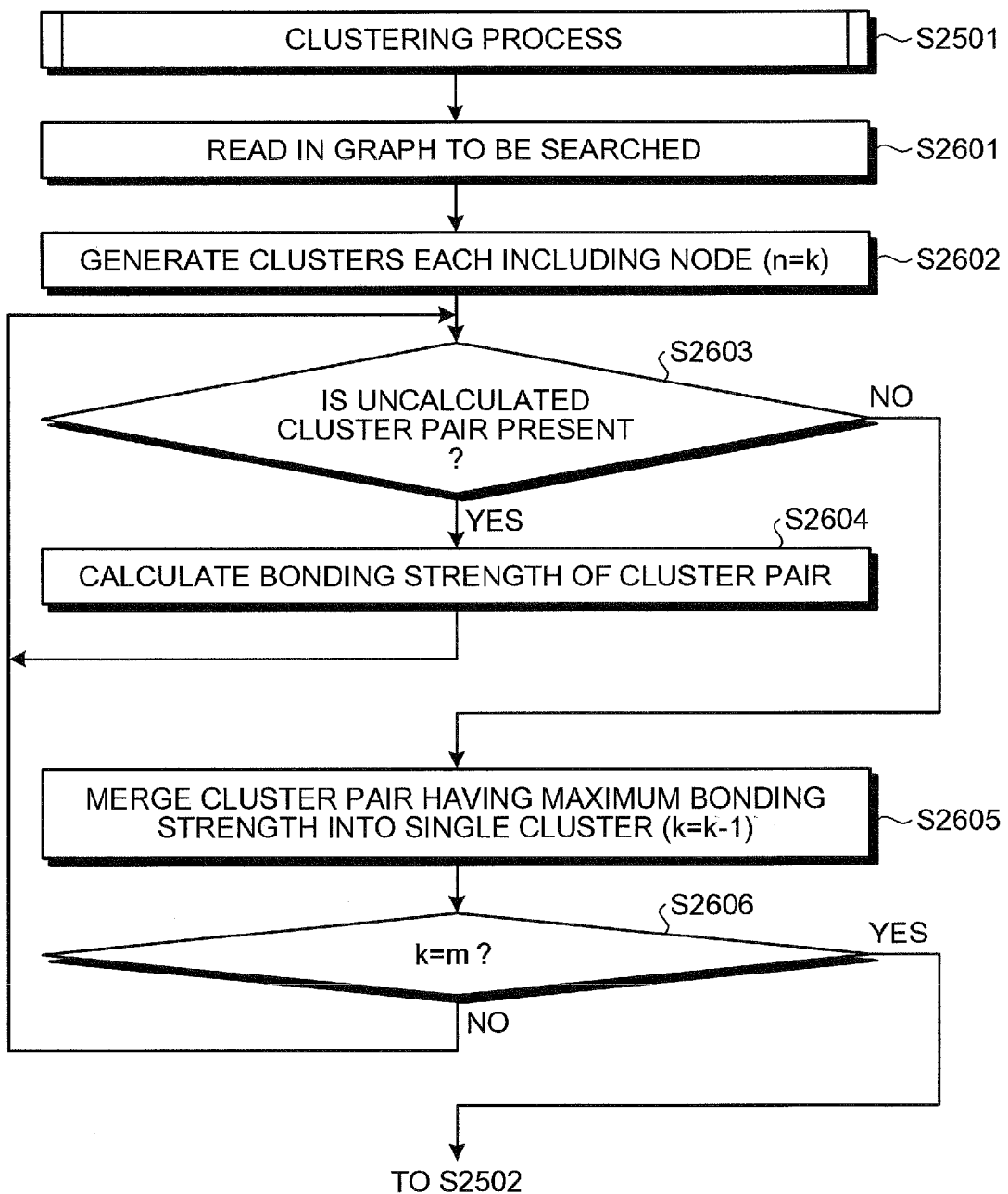
FIG. 26 is a flowchart of a detailed procedure of a clustering process.

FIG. 26 is a flowchart of a detailed procedure of the clustering process. As depicted in FIG. 26, the graph to be searched 100 is read-in (step S2601) to generate clusters each including a node (step S2602). When the total number of nodes in the graph to be searched 100 is n and the same of clusters is k, k=n at this state.

Subsequently, it is determined whether an uncalculated cluster pair is present (step S2603). When an uncalculated cluster pair is present (S2603: YES), the bonding strength of the uncalculated cluster pair is calculated (step S2604), after which the procedure returns to step S2603. When an uncalculated cluster pair is not present (step S2603: NO), the cluster pair having the maximum bonding strength is merged into a single cluster (step S2605). As a result, the value of k changes to k−1.

Then, it is determined whether k=m (step S2606). This reference numeral m denotes the desired number of clusters. When k=m is not satisfied (step S2606: NO), k>m is satisfied and the procedure returns to step S2603. When k=m is satisfied (step S2606: YES), the procedure proceeds to the index generating process (step S2502).

Figure 27:
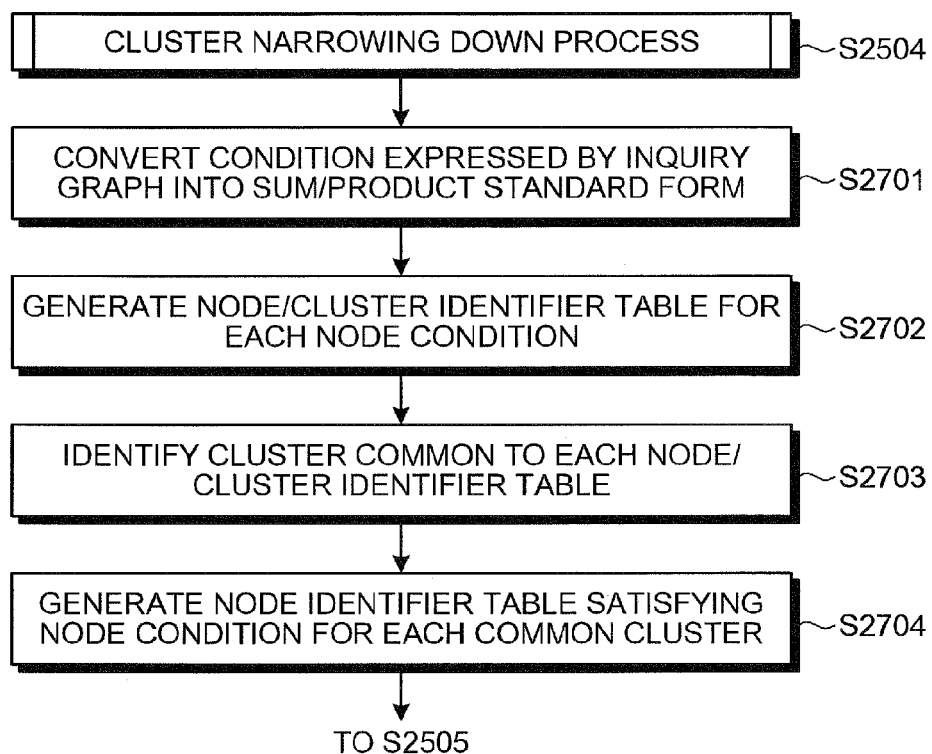
FIG. 27 is a flowchart of a detailed procedure of a cluster narrowing down process.

FIG. 27 is a flowchart of a detailed procedure of the cluster narrowing down process. As depicted in FIG. 27, a condition expressed by the inquiry graph 110 is converted into a condition of a sum/product standard form (step S2701). Then, the node/cluster identifier table ncWi$_j$ is generated for each condition resulting from the conversion (step S2702). A cluster common to each node/cluster identifier table ncWi$_j$ is then identified (step S2703). Subsequently, the node identifier table nWC$_j$ of nodes that satisfy a node condition (e.g., type of business) is generated for each common cluster (step S2704). The procedure then proceeds to the cluster interior searching process (step S2505).

Figure 28:
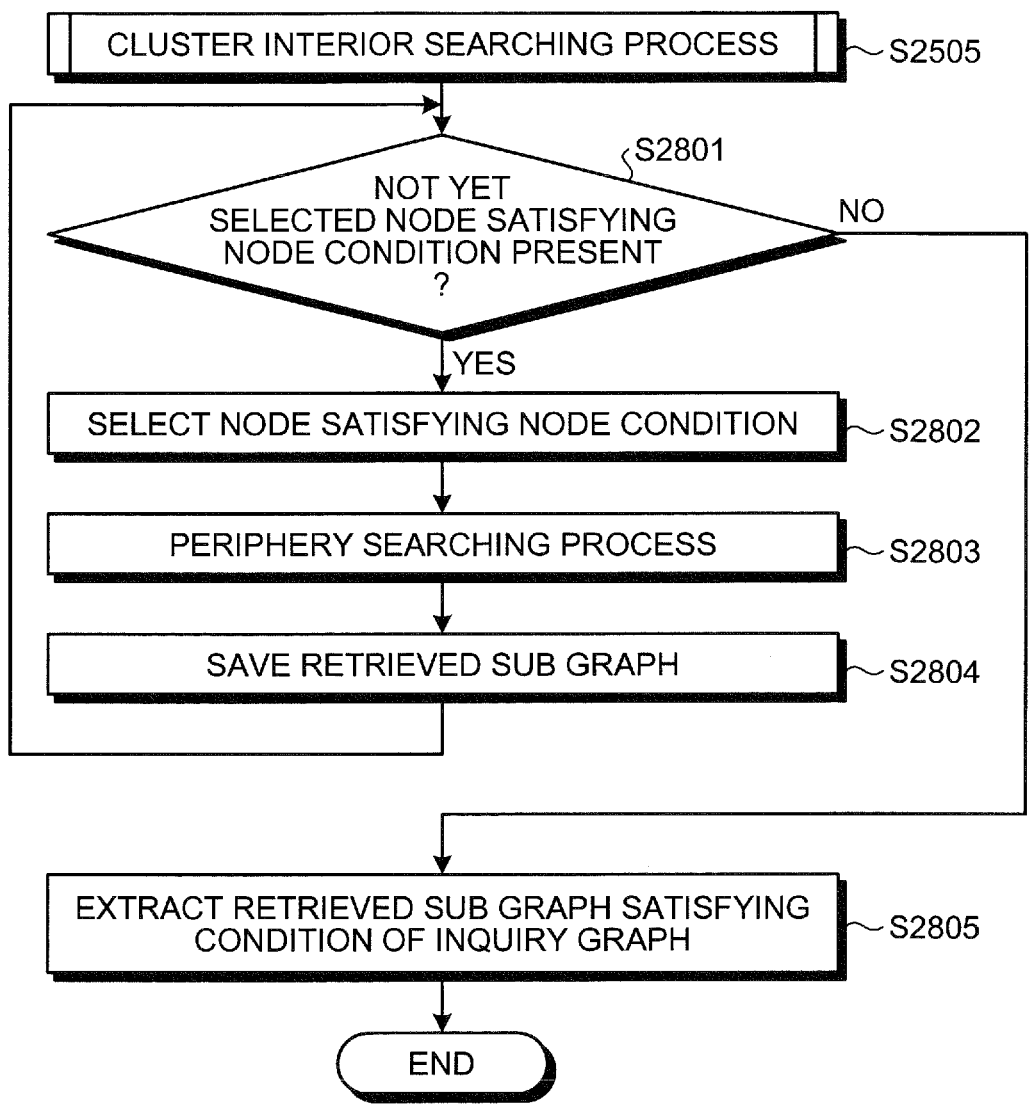
FIG. 28 is a flowchart of a detailed procedure of a cluster interior searching process.

FIG. 28 is a flowchart of a detailed procedure of the cluster interior searching process. As depicted in FIG. 28, it is determined whether a node that has not yet been selected and satisfies a node condition is present (step S2801). When such a node is present (step S2801: YES), a node satisfying the node condition is selected (step S2802).

A periphery search process is then executed (step S2803). For example, because information indicative of the number of nodes and links and the link relationships between nodes and links making up the inquiry graph 110 is acquired from the inquiry graph 110, a sub graph that is identical in the number of nodes and links and the link relationship is searched for. The retrieved sub graph is saved (step S2804), after which the procedure returns to step S2801.

When all nodes satisfying the node condition have been selected (step S2801: NO), a retrieved graph satisfying a condition of the inquiry graph 110 is extracted from among the retrieved sub graphs saved at step S2804 (step S2805). As a result, a sub graph that matches or is related to the inquiry graph 110 is output as a search result.

In this manner, according to this embodiment, performing an approximate search enables to substantially speed up the graph search. In addition, through the clustering process of reducing the number of links between clusters, the precision of a search result can be expected to improve.

Bonding strength is calculated so that the bonding strength of a cluster pair becomes higher as nodes in each of clusters making up the cluster pair becomes fewer. Because of this, a cluster including a greater number of nodes has a lower bonding strength. Hence, the expansion (i.e., increase in the number of included nodes) of such a cluster is suppressed to enable finding a solution matching the inquiry graph in a proper range.

Bonding strength is calculated so that the bonding strength of a cluster pair becomes higher as the order of each of clusters making up the cluster pair becomes lower. Because of this, a cluster serving as a hub in a graph to be searched has a lower bonding strength. By avoiding the hub, therefore, a cluster pair other than a cluster pair involving the hub can be given priority for degeneracy, thereby allowing balanced clustering and enabling the deterioration of search precision to be suppressed while maintaining improved search speed.

Bonding strength is calculated so that the bonding strength of a cluster pair becomes higher as the number of links linking nodes in one cluster to nodes in the other cluster becomes greater, thereby enabling a cluster pair linked strongly to be given priority for degeneracy.

In the calculation of bonding strength, the number of nodes, orders, and the number of links are weighted with adjustment coefficients, thereby enabling customization of the clustering process according to the features of a graph to be searched and user application.

The cluster pair having the maximum bonding strength among a group of cluster pairs is determined to be a cluster pair to be merged, thereby enabling a cluster pair having strong bonding to be given priority in degeneracy and thus enabling an end cluster opposite to a hub cluster to be given degeneracy priority. As a result, an increase in clusters having a possibility of matching an inquiry graph and a reduction in clusters not matching the inquiry graph can achieved simultaneously.

It is determined whether the number of merged clusters has reached a given number m, and when it is determined that the given number m has not been reached, a cluster pair is newly extracted from a group of merged clusters, thereby keeping the number of clusters at a proper number. Hence, the excessive expansion of individual clusters is suppressed to maintain improved search speed while suppressing the deterioration of search precision.

A group of merged clusters are narrowed down based on a condition of an inquiry graph, and a sub graph matching the inquiry graph is retrieved from the group of narrowed down clusters. In this manner, a cluster having a possibility of matching the inquiry graph is identified to prevent the unnecessary search of a cluster not matching the inquiry graph, thereby improving search speed.

The information searching method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory, computer-readable recording medium that stores therein a clustering program that causes a computer to execute:
   setting a plurality of clusters that include a plurality of nodes of a graph, respectively;
   merging a cluster pair having the maximum bonding strength among all cluster pairs into a merged cluster;
   calculating the bonding strength between the merged cluster and each of other clusters; and
   extracting a cluster pair from among clusters after merge when a quantity of the clusters after merge is larger than a given number, wherein
   the calculating includes calculating the bonding strength $f_{pq}$ between the merged cluster and each of clusters linked thereto based on the following equation:

$$f_{pq} = \frac{l(C_p, C_q)^\lambda}{n(C_p)^\nu \times n(C_q)^\nu \times d(C_p)^\delta \times d(C_q)^\delta}$$

where $n(C_p)$ denotes the number of nodes in a first cluster $C_p$; $n(C_q)$ denotes the number of nodes in a second cluster $C_q$; $d(C_p)$ denotes the number of links originating from the first cluster $C_p$; $d(C_q)$ denotes the number of links originating from the second cluster $C_q$; $l(C_p, C_q)$ denotes the number of links linking together the first and second clusters $C_p$ and $C_q$; and $\nu$, $\delta$, and $\lambda$ denote adjustment coefficients.

2. A clustering method that causes a computer to execute:
   setting a plurality of clusters that include a plurality of nodes of a graph, respectively;

merging a cluster pair having the maximum bonding strength among all cluster pairs into a merged cluster;

calculating the bonding strength between the merged cluster and each of other clusters; and extracting a cluster pair from among clusters after merge when a quantity of the clusters after merge is larger than a given number, wherein the calculating includes calculating the bonding strength $f_{pq}$ between the merged cluster and each of clusters linked thereto based on the following equation:

$$f_{pq} = \frac{l(C_p, C_q)^\lambda}{n(C_p)^\nu \times n(C_q)^\nu \times d(C_p)^\delta \times d(C_q)^\delta}$$

where $n(C_p)$ denotes the number of nodes in a first cluster $C_p$; $n(C_q)$ denotes the number of nodes in a second cluster $C_q$; $d(C_p)$ denotes the number of links originating from the first cluster $C_p$; $d(C_q)$ denotes the number of links originating from the second cluster $C_q$; $l(C_p, C_q)$ denotes the number of links linking together the first and second clusters $C_p$ and $C_q$; and $\nu$, $\delta$, and $\lambda$ denote adjustment coefficients.

* * * * *